United States Patent [19]
Eccles et al.

[11] 3,875,390
[45] Apr. 1, 1975

[54] ON-LINE COMPUTER CONTROL SYSTEM

[75] Inventors: Edward Stuart Eccles, Gloucester; Andrew Hurlstone Waddicor, Bristol; Eric Roberts, Bristol; John McNamara, Bristol, all of England

[73] Assignee: The Secretary of State for Defence in Her Britannic Majesty's Government of the United Kingdom of Great Britain & Northern Ireland, London, England

[22] Filed: July 13, 1973

[21] Appl. No.: 378,821

Related U.S. Application Data

[63] Continuation of Ser. No. 160,098, July 6, 1971, abandoned.

[30] Foreign Application Priority Data

July 9, 1970   United Kingdom ............ 33326/70

[52] U.S. Cl. ............... 235/153 AE, 235/153 AK
[51] Int. Cl. ............................................ G06f 15/16
[58] Field of Search ............. 235/153 AE, 153 AK; 340/146.1 BE, 172.5; 244/77 M, 76 R

[56]   References Cited
   UNITED STATES PATENTS

| | | | |
|---|---|---|---|
| 3,482,486 | 12/1960 | Nordholm, Jr. .................. | 244/76 R |
| 3,505,641 | 4/1970 | Boskovich ....................... | 244/77 M |
| 3,517,174 | 6/1970 | Ossfeldt ........................ | 235/153 AE |
| 3,549,108 | 12/1970 | Smith ............................ | 244/77 M |
| 3,636,331 | 1/1972 | Amrehn ......................... | 235/153 AE |
| 3,786,433 | 1/1974 | Notley et al. ................... | 235/153 AE |

*Primary Examiner*—Charles E. Atkinson
*Attorney, Agent, or Firm*—Stevens, Davis, Miller & Mosher

[57]   ABSTRACT

The disclosure of this invention pertains to a control system for two gas turbine engines each having two identical sets of control transducers. Each engine is associated with a digital computer programmed for controlling the fuel flow of the engines. The computer is associated with means for being de-powered in the event of a fault in the computer or a fault completely preventing communication with the engine. Also each computer has means for sensing if the other computer is not on power and, if so, assuming control of the other engine through a switching system for connecting the one computer to either engine. The computer is also programmed, in the event of a fault in a transducer of the one set of transducers of whatever engine it is controlling to operate the switching system to gain access to the corresponding transducer of the other set.

7 Claims, 25 Drawing Figures

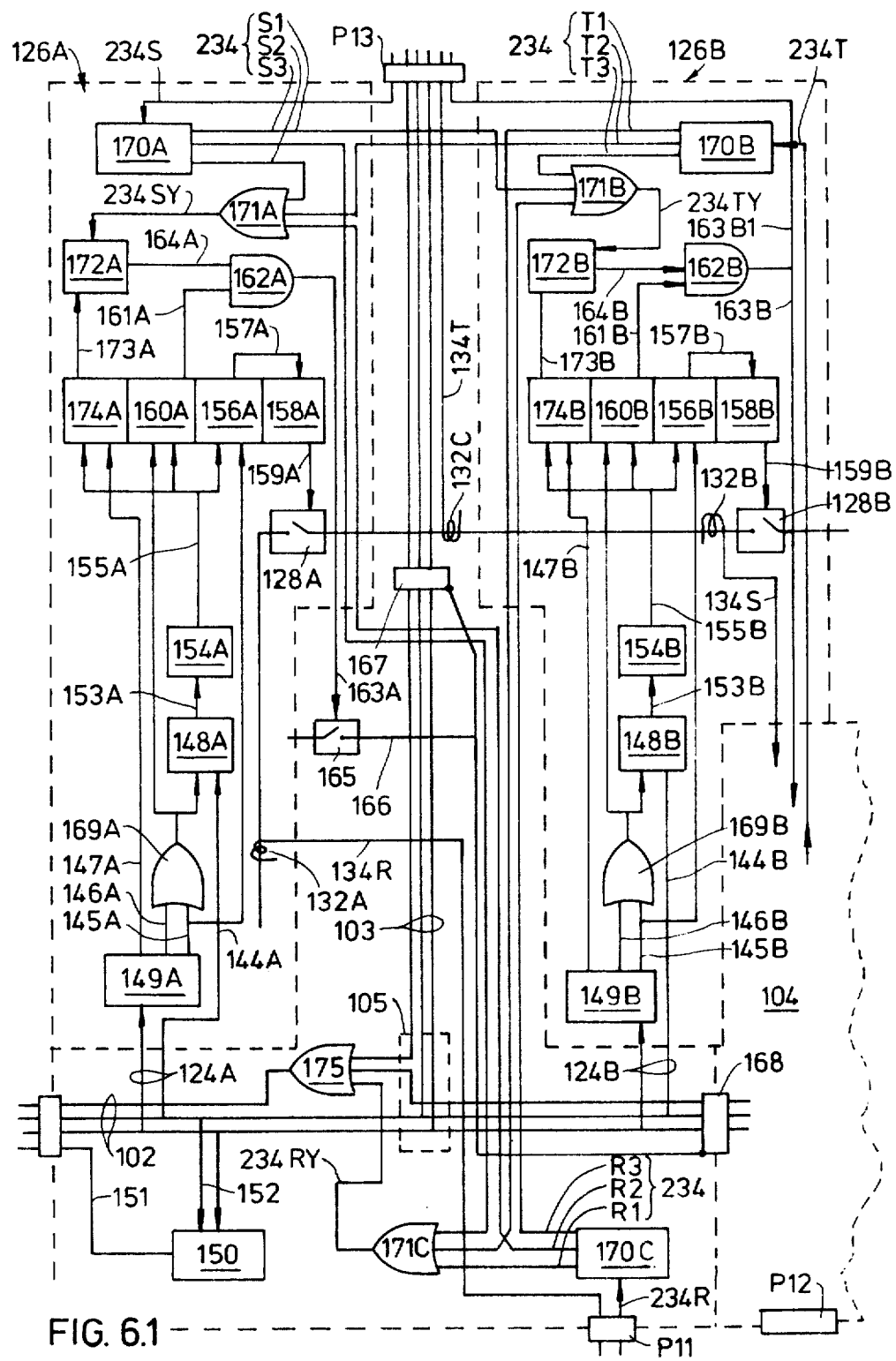
FIG. 6.1

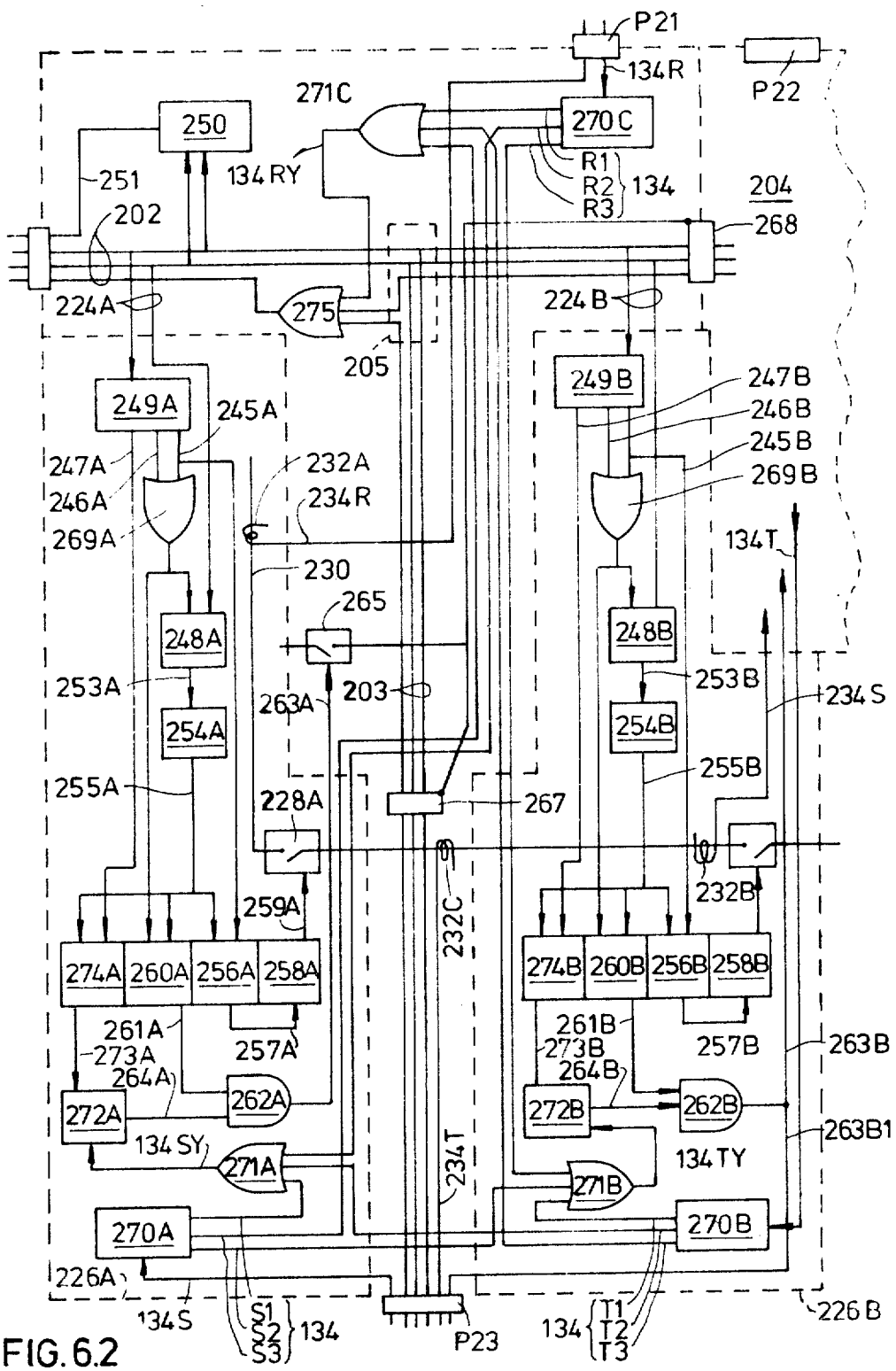
FIG. 6.2

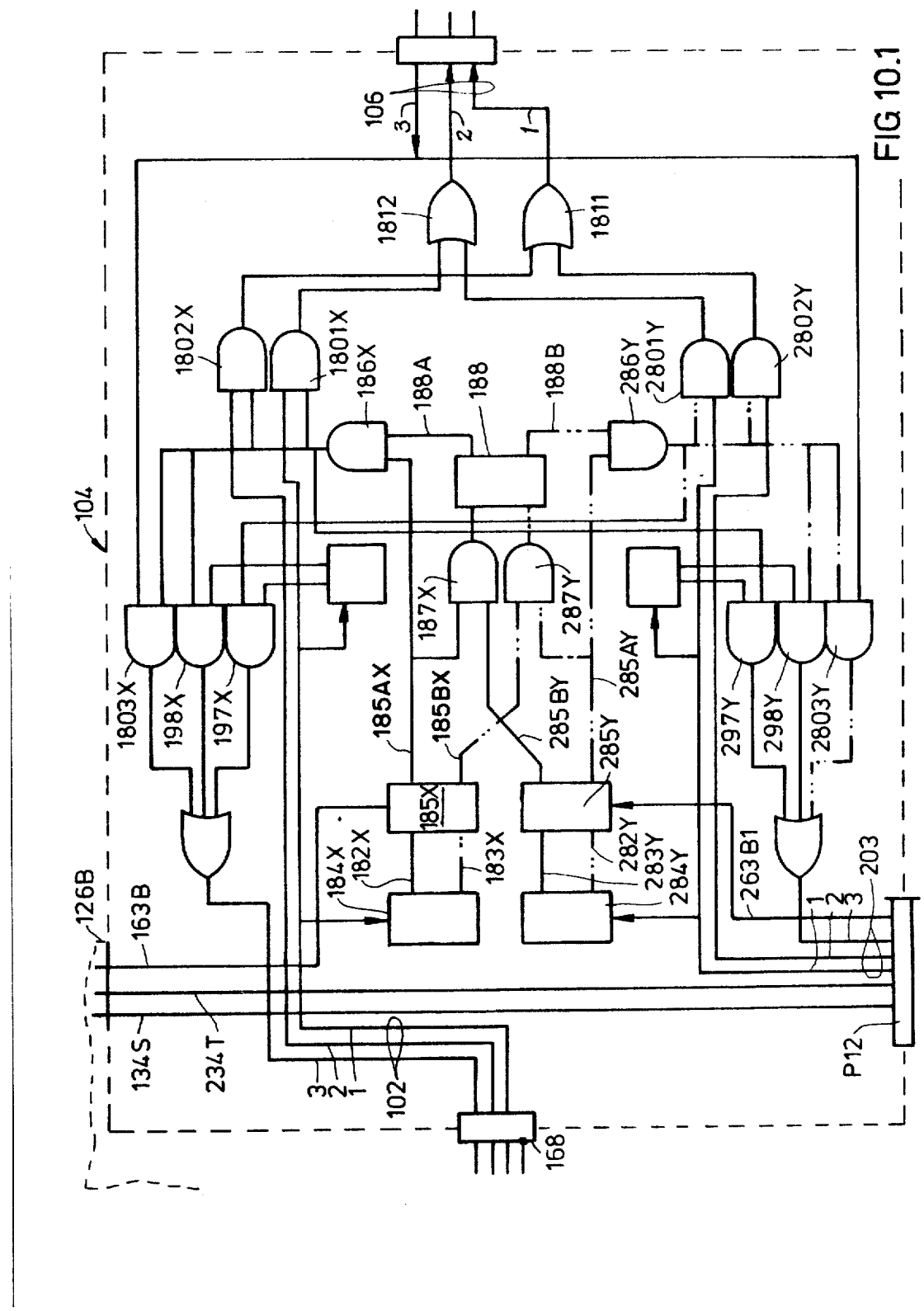

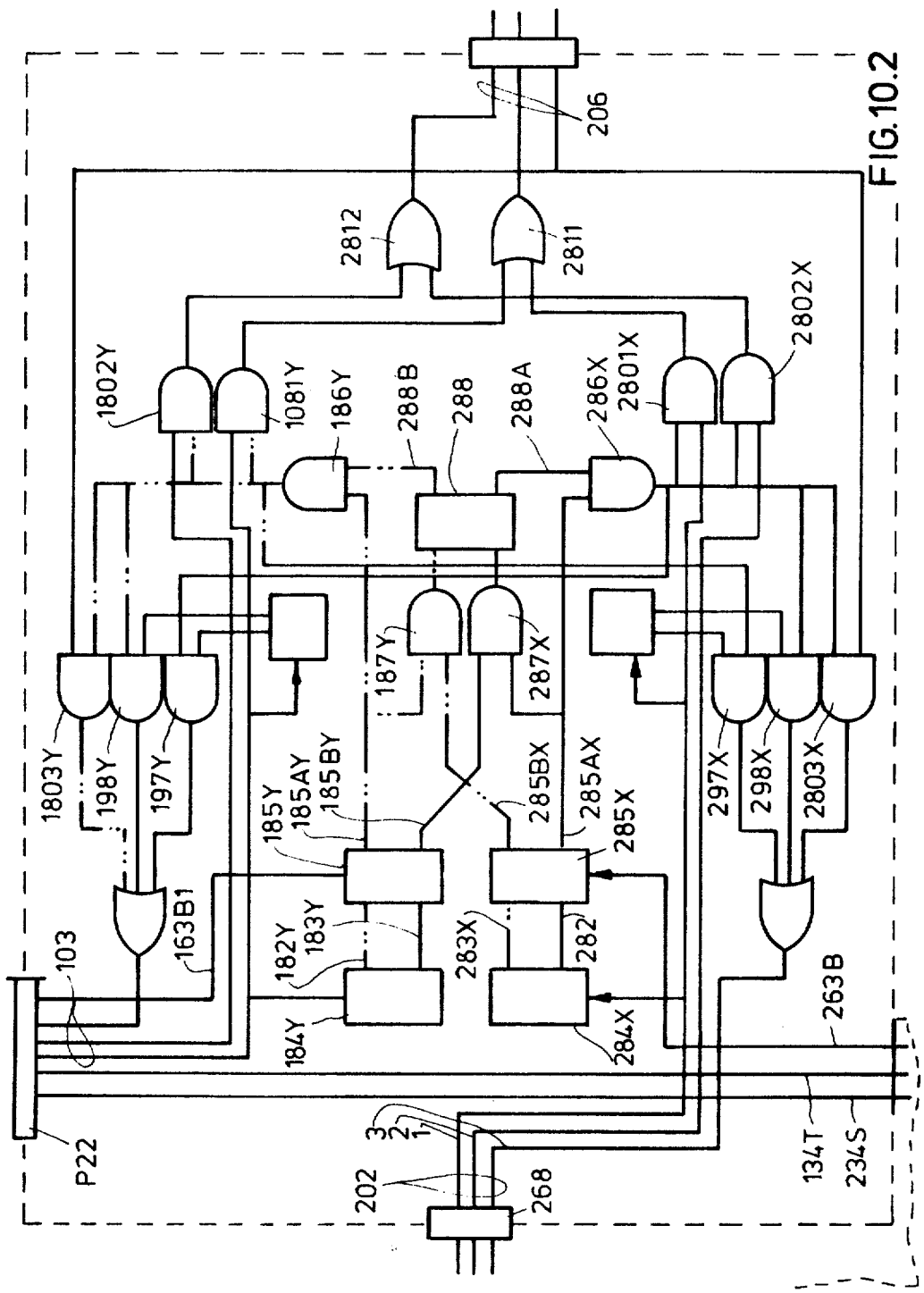
FIG.10.2

ON-LINE COMPUTER CONTROL SYSTEM

This is a continuation, of application Ser. No. 160,098, filed July 6, 1971 and now abandoned.

This invention relates to an on-line computer control system for a technical plant, e.g. gas turbine engines for aircraft propulsion.

It is known to control a single plant by two computers one acting as a safety standby for the other. This means that in the case of an installation comprising two or more plants the number of computers will always be twice that of the plants and that the probability of total failure of the installation on the grounds of computer failure involves the unlikely case of a large number of computers failing simultaneously. Such an installation therefore has an unduly high redundancy factor.

It is also known to provide said single plant with two identical sets of control transducers, the one set being connected to the one and the other set to the other computer. This means that failure of one of the transducers of a set disables the whole computer-to-engine control channel controlling that set and the standby computer, acting on the other set, must be brought into use.

According to this invention an on-line computer control system for a technical plant has two control channels each comprising a computer connectable to an output unit connectable to the plant means for detecting control faults in the channel, fault response means adapted in response to a fault occurring in the channel to disable the computer, and means responsive to the computer of the one channel being disabled to connect the computer of the other channel to the input-output unit of the one channel.

The input-output units of the two channels may be connected respectively to two plants to be controlled. This results in an installation in which although there is only one computer per plant, failure of one of the computers does not deprive both plants of control. In this way an installation comprising two or more plants can be provided with at least two computers and the probability of total failure of the installation on account of computer faults is equal to simultaneous failure of at least two computers. The number of computers in excess of two which is actually employed depends the on degree of safety it is desired to have, and it will be seen that the number of computers need not exceed the number of plants.

The input-output units of the two channels may be connected respectively to two identical sets of control transducers of a plant so that in case of failure of a transducer of the one set the one computer can control the plant through the corresponding transducer of the other set and the plant is only deprived of control in case two corresponding transducers fail simultaneously. To enable such selective use of the transducers to be carried out, said fault detecting means is adapted for the detection of transducer faults and to effect connection of the one computer to the respective output sections accordingly.

If two plants each having two sets of transducers are to be controlled by the system the input-output unit of each channel may be connected to one set of transducers of the one plant and one set of transducers of the other plant, and the system includes means for connecting the computer of each one channel to the output section of the other channel for the purpose of enabling each computer to gain access to both sets of transducers of its associated plant. The advantage of this arrangement is that in the case of a failure of an output section of one of the channels only one set of transducers of each plant is disabled and the output section of the other channel is available for the control of both plants by means of the remaining single sets of transducers.

For the purpose of connecting the computer of each one channel to the output section of either channel, each one channel may comprise a branch connected to the output section of the other channel through a switch for connecting the computers to the latter section alternatively.

It will be clear that since either computer is connectable to the output sections of either channel, it is important that all actions arising from a computer fault situation should be carried out quickly and reliably lest the faulty computer takes control of both output sections. To this end the fault response means of each one channel may comprise a first relay operable in response to a fault to break the access of the computer of the one channel to the output section as well as said branch of the channel, and a second relay operable in response to a fault to cut the power supply to the computer, the latter relay being operable through the intermediary of a delay means so that while the computer access is broken immediately the computer is not depowered immediately lest the fault was a transient one.

Any one channel may include means for sensing whether or not a fault situation exists in the other channel and the latter means may comprise a sensor in the power supply of the computer of the other channel so that if the latter supply is cut in response to a fault, this becomes evident in the one channel and is used for the purpose of connecting the computer of the one channel to both output sections.

For the purpose of fault detection and response, any one channel may comprise means for simultaneously starting two counters at regular intervals of time, the first counter having a fixed count and the second counter having a count determined by the outcome of a check programme to which the computer of the channel is subjected and which latter count bears a predetermined relationship to the fixed count only if the computer is in order, and means for generating a fault output signal if said predetermined relationship is not satisfied. This arrangement makes it possible to obtain a fault response signal for a computer fault with great reliability.

An example of a control system according to this invention, as applied to two computers controlling two aircraft gas turbine engines, will now be described with reference to the accompanying drawings wherein:

FIG. 1 is a block diagram of the system as a whole,

FIG. 2 is a diagram similar to FIG. 1 but simplified and showing the effects of a fault in one of the computers, FIG. 3 is a diagram similar to FIG. 2 but showing the effects of a fault in a highway connection between one of the computers and one of the engines, FIG. 4 is a block diagram showing the control system applied to four engines, FIG. 5 is a block diagram of the program organization of one of the computers, FIGS. 6.1 and 6.2 are logic diagrams of fault response units of the control system, FIG. 7 is a logic diagram of a window generator of the fault response units, FIG. 8 is a detail of a coincidence detector of the fault response units, FIG. 9 is a logic diagram of an interlock arrangement of the control system, FIGS. 10.1 and 10.2 are logic diagrams of highway switches of the control system.

GENERAL SYSTEM LAYOUT

Figure 1:
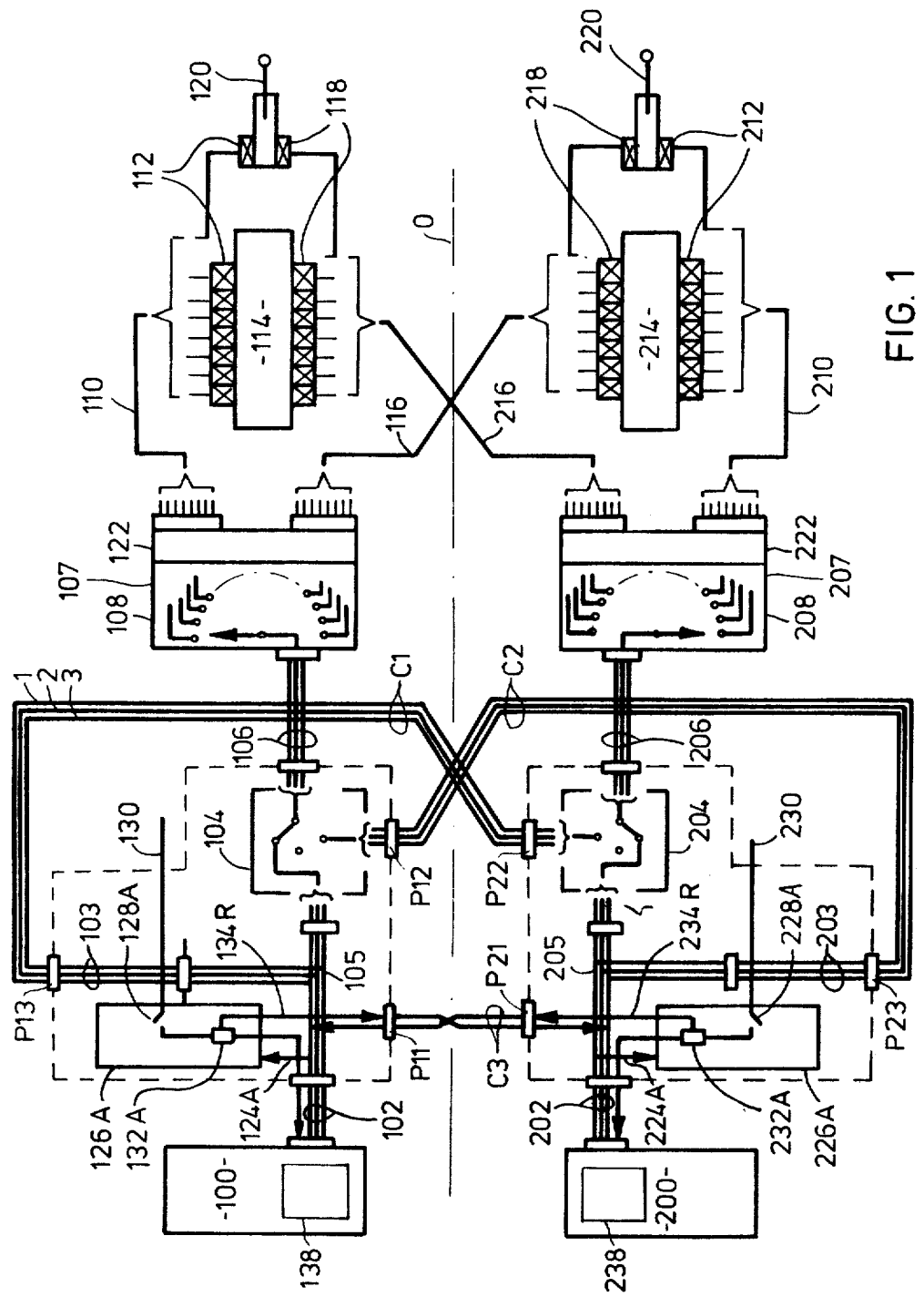

Referring to FIG. 1, there is shown a first digital computer 100 connected to a highway 102 by a highway switch 104. The highway switch 204 is connected by a highway 106 to an input-output unit 107 which is connected by transducer lines 110 to a set of transducers 112 of a first engine 114 and a further set of transducer lines 116 to a set of transducers 218 of a second engine 214.

Similarly, a second digital computer 200 is connected by a highway 202 to a highway switch 204 connected by a highway 206 to an input-output unit 207 which is connected by transducer lines 210 to a set of transducers 212 of the engine 214 and by further transducer lines 216 to a set of transducers 118 of the engine 114.

The highway 102 has a branch 103 emanating from a junction 105 whereby the computer 100 can be connected through the switch 204 to the highway 206. The highway 202 has a branch 203 emanating from a junction 205 whereby the computer 200 can be connected through the switch 104 to the highway 106.

The highways 102, 103, 106 and the switch 104 are referred to as the highway system of the computer 100, and there is a corresponding highway system for the computer 200.

The transducers 112, 118, 212, 218 are either in the form of actuators for producing an output action in the engine concerned or in the form of sensors for producing an information signal from the engine or its environment.

Associated with the respective engines 114, 214 are two pilot's throttle levers 120, 220 where a demand signal for engine speed or fuel flow can be fed to the computers. The position of the lever 120 is sensed by one each of the transducers 112, 118 respectively and the position of the lever 220 is sensed by one each of the transducers 212, 218.

It is to be understood that the transducers 112 are duplicates of the transducers 118, i.e. there is in respect of each parameter a pair of like transducers 112, 118. The transducers 212, 218 similarly form pairs.

The input-output units 107, 207 include multiplexers 108, 208 for addressing the individual transducer lines 110, 116, 210, 216, and further include in respect of these lines converters 122, 222, for establishing compatibility between the digital computers and the generally analogue transducers.

Each highway consists of three lines being the input highway 3 connected to the sensors, the output highway 2 connected to the actuators, and the address highway 1 whereby the computer selects the particular transducer or other item of equipment to be connected to the computer for input or output.

In FIG. 1 the highway switches and the input-output units are shown symbolically as simple rotary switches. The actual construction is described and illustrated in detail later herein. It is sufficient at this stage to say that the highway switches are operated by address signals on the address highway, the address highways themselves being switched by address signals on those highways. Likewise the multiplexers are switched by address signals.

Normally the computer 100 controls the engine 114, this being its "associated" engine, and the computer 200 controls the engine 214. Communication between the computer 100 and the transducers 112 is through the lines 110 but communication between this computer and the transducers 118 is through the branch 103 and the lines 216. Similarly the computer 200 can address the transducers 212, 218 respectively through the highways 206, 106.

As will be seen, each of the computers is capable of addressing the switches 104, 204 to gain access to the multiplexers, provision being made to prevent simultaneous access by the computers to the same multiplexers.

The computer 100, its highway system, its fault system (to be described) and its input-output unit 107 and its transducers 112, 118 constitute a control channel 101. There is a corresponding channel 201. It will be clear that the computer 100 can gain access to the transducers 118 only by way of the channel 201, using the highway 103 and transducer lines 216. Correspondingly the computer 200 must go through the channel 101 for access to the transducers 218. The dividing line between the two channels is arbitrarily indicated by a centre line 0 but actually this dividing line is somewhat complex. For example, as far as the highway 103 is concerned the channel 101 ends in the switch 204.

For reasons of safety the channels 101, 201 are mounted in the aircraft in which the engines are installed in positions which are spaced apart from each other as far as is practicable, and the channels are connected to each other by three cables C1, C2, C3 two of which carry the highways 103, 203 while the third is provided for the fault system (to be described). The cable connections are effected by plugs P11, P12, P13 in the channel 101 and plugs P21, P22, P23 in the channel 201.

TYPES OF FAULT AND THEIR RELATION TO SYSTEM LAYOUT

The computer 100 is programmed to detect faults, specified below, and has a fault system comprising a connection 124A from the output line of highway 102 to a fault response unit 126A operating, on detection of certain faults, to release a relay 128A thereby breaking a line 130 being the power supply to the computer. This break is sensed by a sensor 132A connected by an interlock line 134R to the input line of the highway 202 of computer 200 so that a break in the power supply to the computer 100 is signalled to the computer 200. The latter computer has, in addition to the control programme for the engine 214, a standby control programme for the engine 114, and on receipt of the signal 134R the computer 200 activates the standby programme and thereby takes over control of the engine 114 along with engine 214.

The computer 200 is similarly programmed to detect faults, and have control of its engine 214 taken over by the computer 100 in the event of a break in a line 230 being the power supply line of the computer 200. To this end the computer 200 has a connection 224A to a fault response unit 226A capable of acting on a relay 228A for breaking the line 230 and through a sensor 232A and link line 234R communicating such break to the computer 100.

The faults which the fault system of each channel is organised to detect are as follows:

a. computer fault, being a fault in the computer and includes a fault in the fault system itself.

b. complete communication fault, being a fault making it impossible for the computer to gain access to whatever engine, 114 or 214, which it may seek to control. A complete communication fault necessarily requires the existence of two faults, e.g. a fault in each of highways 103, 106 making it impossible for computer 100 to gain access to engine 114, or a fault in each of two corresponding transducers 112, 118.

c. partial communication fault, e.g. a fault in a transducer or transducer line but affecting only one of a pair of corresponding transducers so that the engine can still be controlled through the other transducer of the pair.

d. interlock fault being a fault affecting the correct reading by one computer of the state of the power supply of the other computer.

These different faults will be discussed in detail later below but at this stage it is pointed out that the general lay-out of the system is especially adapted to cope with the above computer and communication faults.

The relationship between system layout and certain faults is in now discussed with reference to FIGS. 2 to 4.

Figure 2:
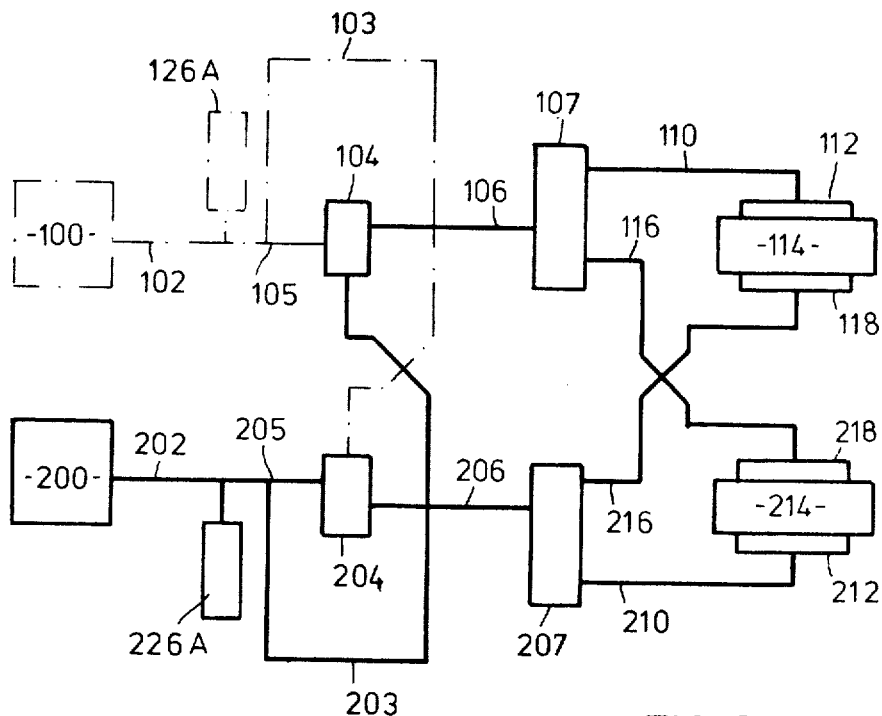

The effect of a computer fault is illustrated in FIG. 2 where it is assumed that computer 100 has failed and is de-powered so that there is no output on the highways shown in chain-dotted lines. The highways now controlled by the computer 200 are shown in thick lines. It will be seen that by virtue of the routing of the computers through the highway switches 104, 204, the computer 200 can take full control of engine 114 simply by the engine 114 standby programme in the computer 200 addressing the switches 104, 204 for access to the engine 114. It will also be noted that there is no loss of access to any of the transducers.

Figure 3:
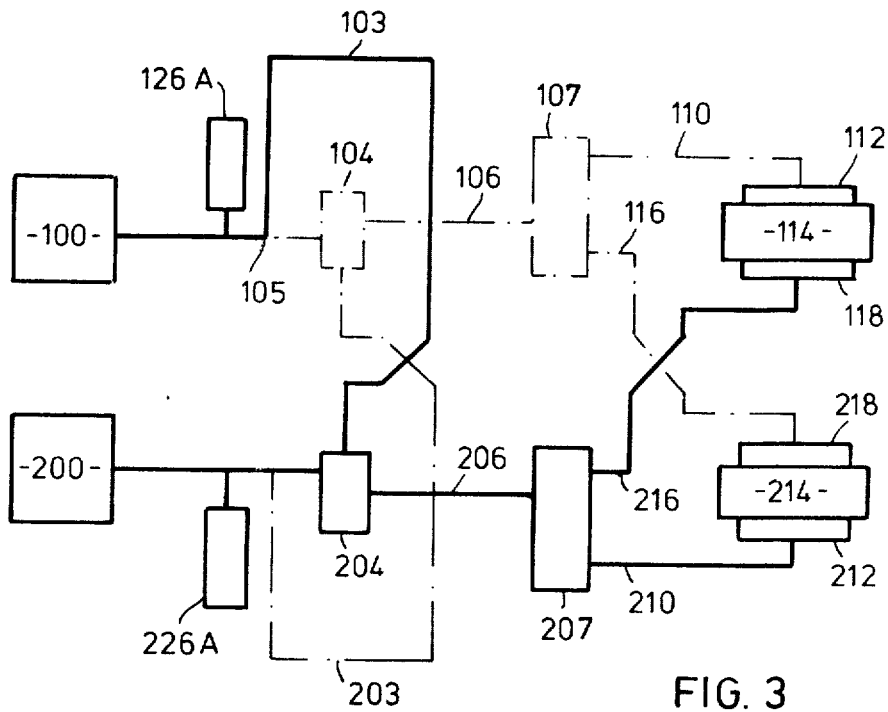

The effect of a partial communication fault is illustrated in FIG. 3 where it is assumed that there is a fault somewhere between the junction 105 and the input-output unit 107 so that the highway 106 is useless and no transmission can usefully be effected on the paths shown in chain-dotted lines. It will be seen that, by virtue of each engine having two similar sets of transducers and each input-output unit 107, 207 being connected to one set of transducers of the one and one set of transducers of the other engine, loss of highway 106 does not result in loss of access to the engine 114. The computer 100 continues to control the engine 114 through the transducers 118 and the computer 200 continues to control the engine 214 through the transducers 212.

If a computer and a partial communication fault occur together then the remaining computer controls the remaining transducers of the two engines.

Figure 4:
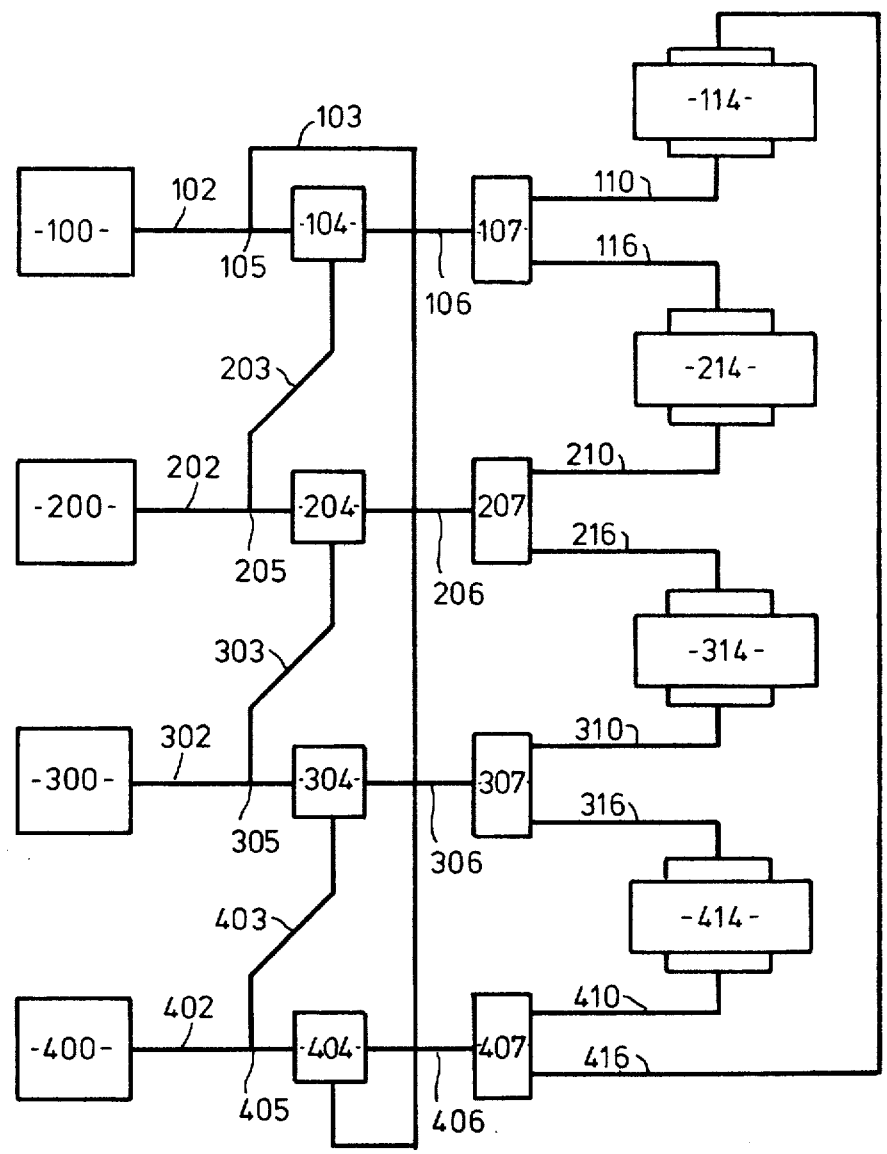

FIG. 4 shows a system involving four engines denoted 114, 214, 314, 414 and corresponding numbered computers and highways, there being one computer, one highway switch, and one input-output unit per engine. It will be seen that each computer has access to the two sets of transducers of one engine and to one set of transducers of either of the adjacent engines so that all but two of the computers can be lost without affecting control provided only that each computer has control programmes for three engines. A partial communication fault in respect of any one engine would only deprive that engine of access to one of its two transducer sets. By varying the transducer connections it is possible to vary the access pattern so that for example each computer can be given access to all engines.

DETECTION OF FAULTS

The fault system associated with each channel 101 or 201 comprises programs for detecting faults, a fault responsive system essentially concerned with converting the outcome of the fault detection programs into action on its associated channel, an interlock system by which the state of the one channel is communicated to the computer of the other channel, and programming in the other computer to take over the duties of the one computer if required.

Figure 5:
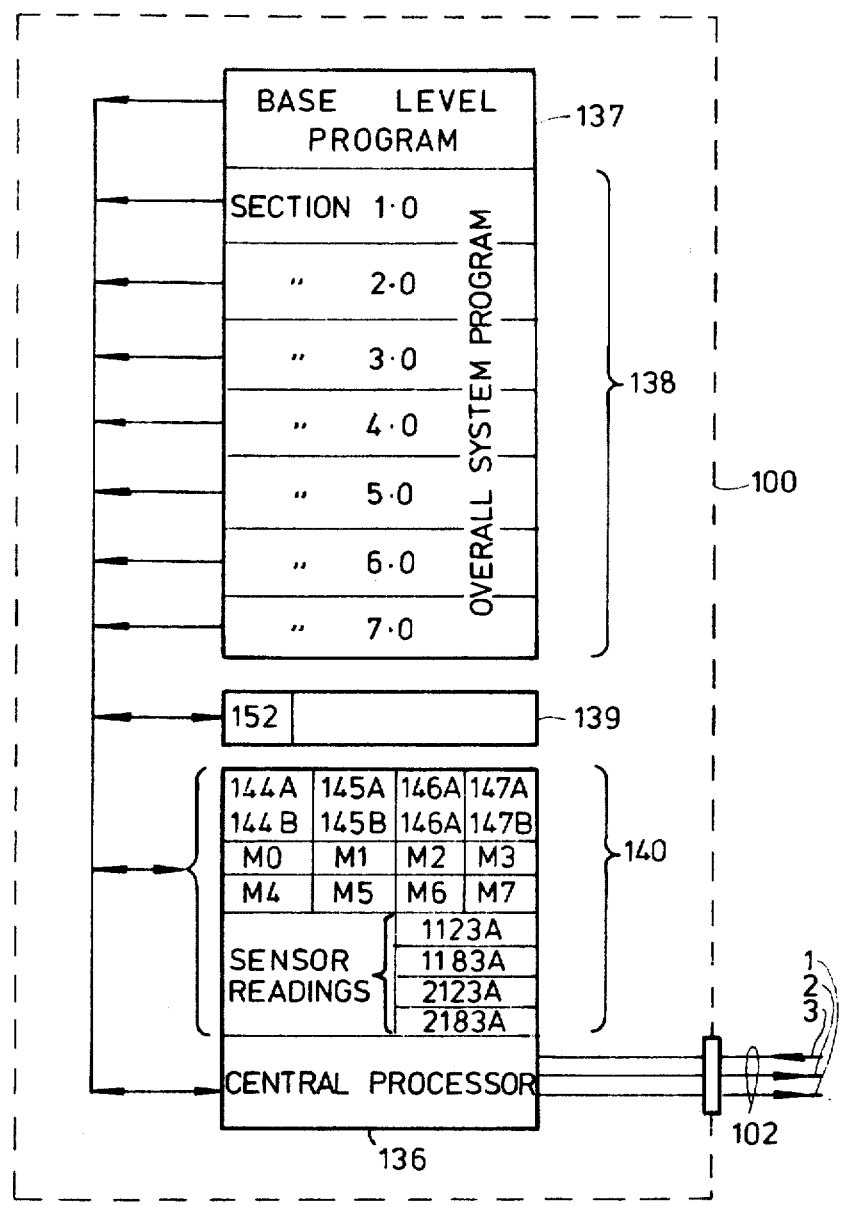

FIG. 5 shows the computer 100 as comprising a central processor 136, a base level program 137, an overall system program 138 for the control of the engines and stores 139, 140. The program 138 comprises seven sections 1.0 to 7.0. These are descirbed in detail later herein and brief mention only will be made at this stage of the fault detection aspects of the program 138.

Computer faults are detected by the computer carrying out a number of check calculations resulting in a check number which, if the computer is in order, is the same as a known standard number. This check number is communicated to the response system to be compared with the known number.

Communication faults affecting the highways are detected by the computer sending a test signal on to the output highways which, if the highway system is correct, results in given check signals on the input highway and a consequent fault or no fault signal to the fault response system.

Single transducer faults may be detected e.g. by failure of the sensors to conform to a model stored in the computer and result in the faulty transducer not being operated.

Interlock faults are detected directly by a comparison device in the fault response system and have the same effect as a complete communication fault. The same applies to any other failure in the fault response system.

The response system is adapted, in case of computer faults or complete communication faults, to cut the power to the computer through said relay 128A or 228A but, as will be explained, this power cut is subject to a delay period so that transient faults have the opportunity to correct themselves. In the case of a computer fault however, the highways of that computer are disconnected immediately to avoid a faulty computer carrying out a control program.

Before continuing with the fault system some further details of the overall system have to be mentioned.

Referring to FIG. 5, the highway 102 is shown as comprising lines 1, 2, 3 respectively carrying address, output and input signals. Each output or input signal to be effective requires an accompanying address signal which is read by an address decoder adapted to produce a discrete signal on a line connected to the device, e.g. a transducer, to which the output or input relates thereby to connecting that device for reception of the output from the computer or transmission of the input to the computer. Unless required by the contex the address signals and decoders are not shown, it being generally sufficient to show the output or input signals only. In some cases it is sufficient for an address signal alone to transmit an action, as in the case of setting a bistable.

Reverting to the fault system, the program 138 feeds said check number into store 140 from which it is read out on to the output highway by a data signal 144A accompanied by address signal 145A on the address highway. If there was a complete communication fault the signal 144A is accompanied by an address signal 146A. In other words, the signal 144A is read out either by address signal 145A or address signal 146A depending on whether there was a computer or a complete communication fault. A signal 234RY indicative of whether or not the computer 200 is on power is read into the store and read out again (for check purposes) as address signal 147A. These four store read-outs are referred to as the "A" fault signals. There is a similar set of "B" fault signals all having the suffix "B" which is read out directly after the "A" signals.

The fault signals are read out to the fault response system, and in this connection the fault system takes advantage of the fact that the channels are operated by the sample data method whereby the whole of the overall system programme is repeated at short time intervals, in this example every 50 milliseconds, referred to as the "sample periods." The reading out of the fault signals takes place at the beginning of each sample period, the actual fault checks having been made towards the end of the previous sample period. The significance of this is that the constant time interval represented by the sample period is used as the standard with which the check number signals 144 (i.e. the signals 144A, 144B) are compared to enable the response system to establish whether or nor there is a fault.

Figure 12:
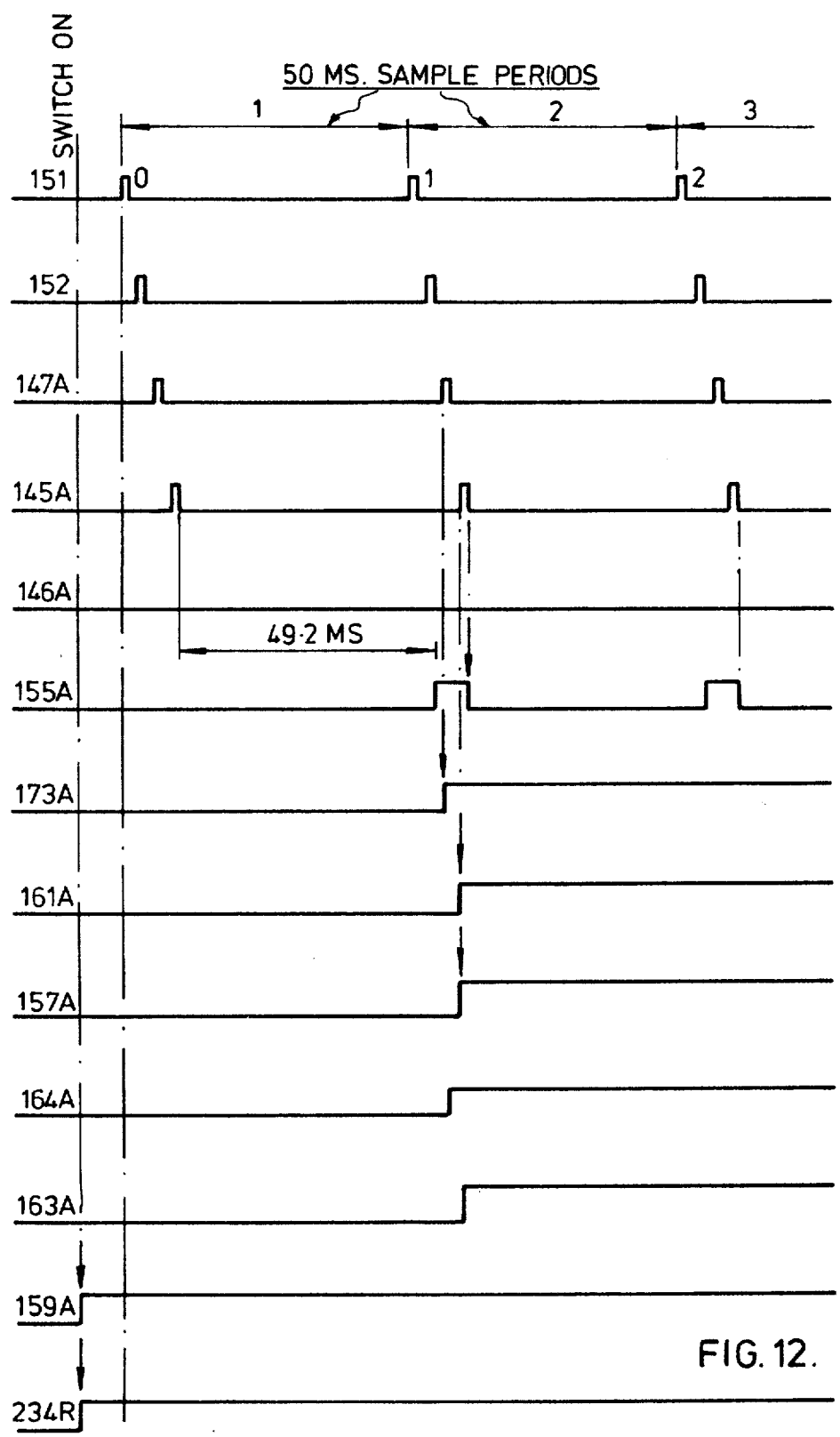
FIG. 12 is a signal timing diagram for the control system.

Referring now also to FIG. 12, each sample period is started by a counter or sample rate clock 150 (FIG. 6.1) which at the end of its count generates an interrupt signal 151 to interrupt the computer base level programme and initiate the overall system program whose first action, prior to reading out the fault signals, is to reset the clock 150 for the next count by causing the store 139 storing the reset number to be connected to the clock so that the reset number, in the form of a signal 152, is communicated to the clock 150 which immediately starts counting the next sample period.

FAULT RESPONSE SYSTEM

The fault response system of the channel 101 comprises said fault response unit 126A and a duplicate unit 126B as shown in FIG. 6.1.

The units 126A and 126B receive the "A" and "B" fault signals respectively, and translate them into actions necessary to safeguard the operation of the engines. Only the unit 126A is discussed in detail and mention is made of unit 126B only insofar as is necessary to point out the interconnection between these units and a minor distinction in their connection to other systems.

The "A" fault signals are transmitted by the highway 102 to the unit 126A where the check number signal 144A is connected to a counter 148A. The signals 145A, 146A and 147A are read by an address decoder 149A capable of discriminating beween these signals and issuing them on separate lines as shown.

On receipt of the appropriate signal 144A the counter 148A is set to count a number equal to that represented by the signal 144A. The program 138 is arranged so that if the computer is in order the check number represented by the signal 144A can be counted by the counter 148A in a time having a fixed relationship to the sample period, i.e. a fixed relationship to the number in the signal 152 which determines the sample period. In the present example the relationship is such that the counter 148A takes slightly less than the counter 150 to complete the correct count, say 49.2 milliseconds as against 50 milliseconds.

The counter 148A is adapted at the end of its count to produce a signal 153A which causes a further counter 154A to make a count of relatively short period maintaining for that duration a signal 155A referred to as the "window." The combination of the two counters 148A, 154A is also referred to as the "window generator." Since the fault signals are read out in fixed relationship to the signal 151 of the counter 150, it follows that if the check number signal 144A read out at the beginning of any one "current" sample period, was correct the counter 148A counts for a period such that the resulting window occurs over a period coinciding with the occurrence of the fault signals at the beginning of the next sample period.

More specifically and as shown in FIG. 12, the signal 155A is made sufficiently long to make it possible for the signals 147A, 145A to take place within the period of the signal 155A, and the signal 144A is such that when the computer check number is correct the signals 147A, 145A do in fact occur during the period of the signal 155A. If there is a complete communication fault, the signal 146A takes the place of the signal 145A.

The counter 154A is adapted to set the signal 155A back to zero after said relatively short period but if the fault signals occur during the latter period the fault signals themselves set the signal 155A to zero.

It will now be seen that the reason for the count of the counter 148A being of slightly shorter duration than that of the counter 150 is to give the next following signal 144A time to occur safely within the period of the signal 155A. The reason for choosing the same signal 144A both for the computer as well as the communication faults is to make it possible for the same counter 148A to be used for either fault.

The corresponding fault response system of channel 201 is shown in FIG. 6.2, the only difference between the two systems being in the reference numerals which, in respect of channel 101 start with the figure "1" and in respect of channel 201 start with the figure "2."

WINDOW GENERATOR

Figure 7:
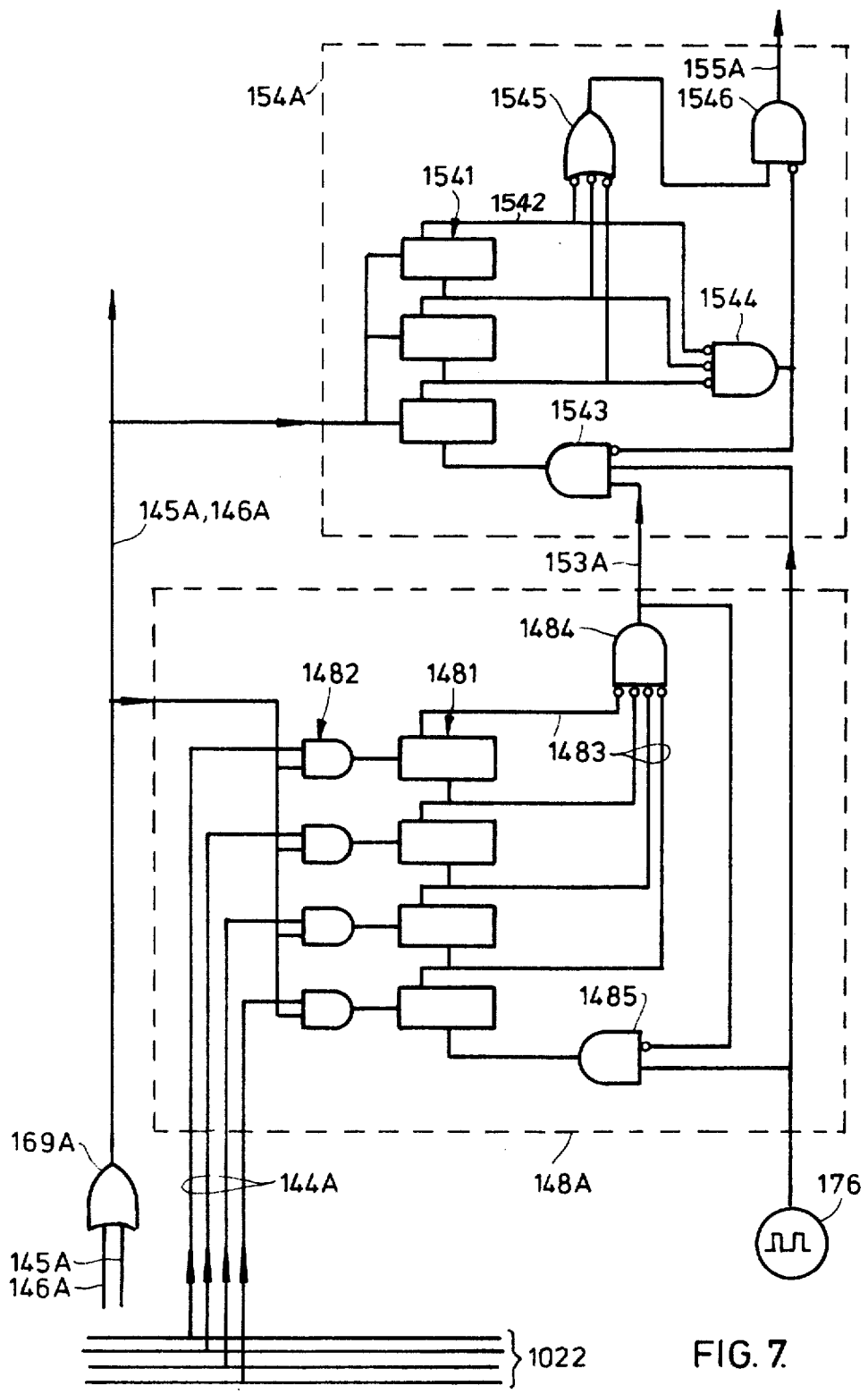

Details of the window generator 148A, 154A are now described with reference to FIG. 7. The counter 148A comprises bistables 1481 connected to form a binary counter in a manner known per se. The counter is arranged to count down from a number set by the outputs of AND gates 1482 whereby outputs 1483 of the bistables can be set to "1" or "0" as required to define a given number. The AND gates 1482 each have an input from the output 145A or 146A of an OR gate 169A. The other inputs of the AND gates 1482 are the respective digits of the signal 144A here represented by four lines from the corresponding four lines of the output highway 1022. In practice the output highway has 12 lines for carrying a 12-bit signal 144A. The counter is adapted to be driven by an oscillator 176. The outputs 1483 are inverted and taken through an AND gate 1484 whose output, the signal 153A, is "0" (i.e. false) unless all the outputs 1483 are "0." At this stage the counter is stopped by a connection between the signal 153A and an AND gate 1485.

The counter 154A comprises a series of interconnected bistables 1541 arranged to count down from an initial state in which the output 1542 of each bistable is set at "1." This state can be set by the signals 145A or 146A as shown. The counter 154A is driven by the oscillator 176 through an AND gate 1543 enabled by the signal 153A and adapted by a NAND gate 1544 to be disabled when the outputs 1542 are all at "0," i.e. when the counter has counted down to zero. The outputs 1542 are adapted to produce the signal 155A by being taken through a NOR gate 1545 whose output is "1" for so long as any of its inputs is "0," and finally through an AND gate 1546 arranged to be disabled (i.e. made "false") when the counter reaches zero or is initialized by the signals 145A or 146A.

It will be clear that the counters 148A, 154A cooperate to produce the signal 155A after a period time determined by the signal 144A, and that the signal 155A persists for a period of time commencing with the occurrance of the signal 153A and ended by the maximum count of the counter 154A or the next following occurrence of the signals 145A or 146A. The timing of these signals is also apparent from FIG. 12.

It will be clear that it does not matter whether the counters 148A, 154A are arranged to count up or down.

The counter 150 (FIG. 6.1) is of a similar construction to that of counter 154 and need not be described in detail. The counter 150 is driven by an oscillator (not shown) separate from the oscillator 176. Also the counter 150 is counted in the opposite sense (i.e. up if the counter 148A is counted down). These provisions diminish the possibility of an oscillator or like fault not being detected.

The three fault conditions represented by the signals 144A and 145A (computer fault), 144A and 146A (communication fault), and 147A (interlock check) will now be considered in detail as far as the fault response and interlock systems are concerned.

COMPUTER FAULT RESPONSE

The signals 145A, 155A are fed to a coincidence detector 156A having an output 157A which goes true if and only if the whole of the signal 145A occurs during the period of the signal 155A and which output is held true thereafter unless it should happen that this condition is not satisfied during a subsequent occurrence of the signals 145A, 155A. Details of the unit 156A are described separately with reference to FIG. 8.

The output 157A is connected to a delay counter 158A whose output 159A is connected to said relay 128A in the power supply line 130 to the computer.

Thus unless the signal 157A is true the computer is depowered after the period of the delay unit, in this case 0.5 second, and the routine for the computer 200 taking over will be initiated.

The delay period, equal to 10 sample periods, is allowed for spurious faults to clear themselves, but to ensure that no damage is done meanwhile, the highways are disconnected immediately by means of a second coincidence detector 160A to which the signals 155A and 145A are also connected and which has an output signal 161A which goes true under the same conditions as for the detector 158A.

Figure 13:
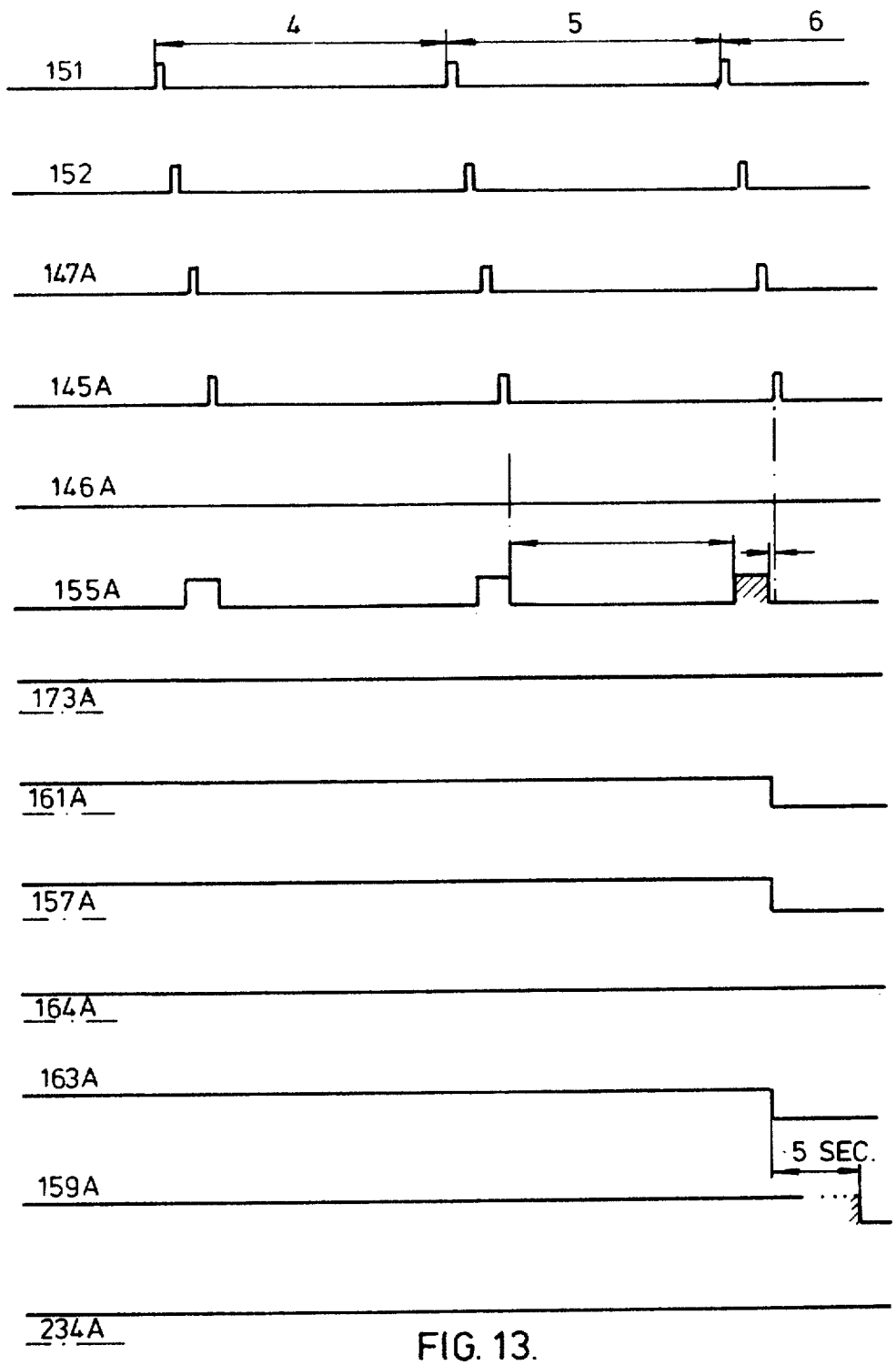
FIG. 13 is a continuation of FIG. 12 and shows the effect of a computer fault.

The signal 161A is fed to an AND gate 162A whose output 163A is true if both inputs are true and whose other input 164A is in fact true when there is no computer interlock fault (see description of the effects of signal 147A below). The signal 163A is connected to a relay 165 so that if the signal 163A is false a power supply 166 is interrupted thus de-powering optoelectronic couplers 167, 168 which respectively connect the highway junction 105 to the highway 103 and the highway switch 104. Thus failure of coincidence of the signals 145A and 155A during the window period results in immediate de-coupling of the highways in addition to the starting of the 0.5 second delay mentioned. This condition is shown in FIG. 13.

If the computer fault was transient and corrects itself during the delay period then the highway couplers will be powered again by the signal 163A going true. Likewise the delay counter will be returned to zero or will be caused to count down if signal 157A goes true. Preferably the counter 158A is organised to count down if signal 157A is false at a rate faster than the rate at which it counts upward when the signal is true. Thereby intermittent faults of less than 0.5 second duration are recognised if they occur at a frequency sufficient to overcome the count-down action. Such faults could, if not detected, have a deleterious effect on control.

In the case of the fault response unit 126B the signal, denoted 163B, out of the corresponding AND gate 162B is not led to a relay such as 165 but is led to the highway switch 104. Details of this are given later herein below in the description of the highway switch. The signal 163B has a branch 163B1 connected to the switch 204 of the computer 200. This aspect is the only difference between the units 126A, 126B.

RESPONSE TO COMPLETE COMMUNICATION FAULT

In the case of a computer fault the counter 158A was started to depower the computer in 0.5 seconds and the relay 128A was operated to disconnect the computer immediately.

Figure 14:
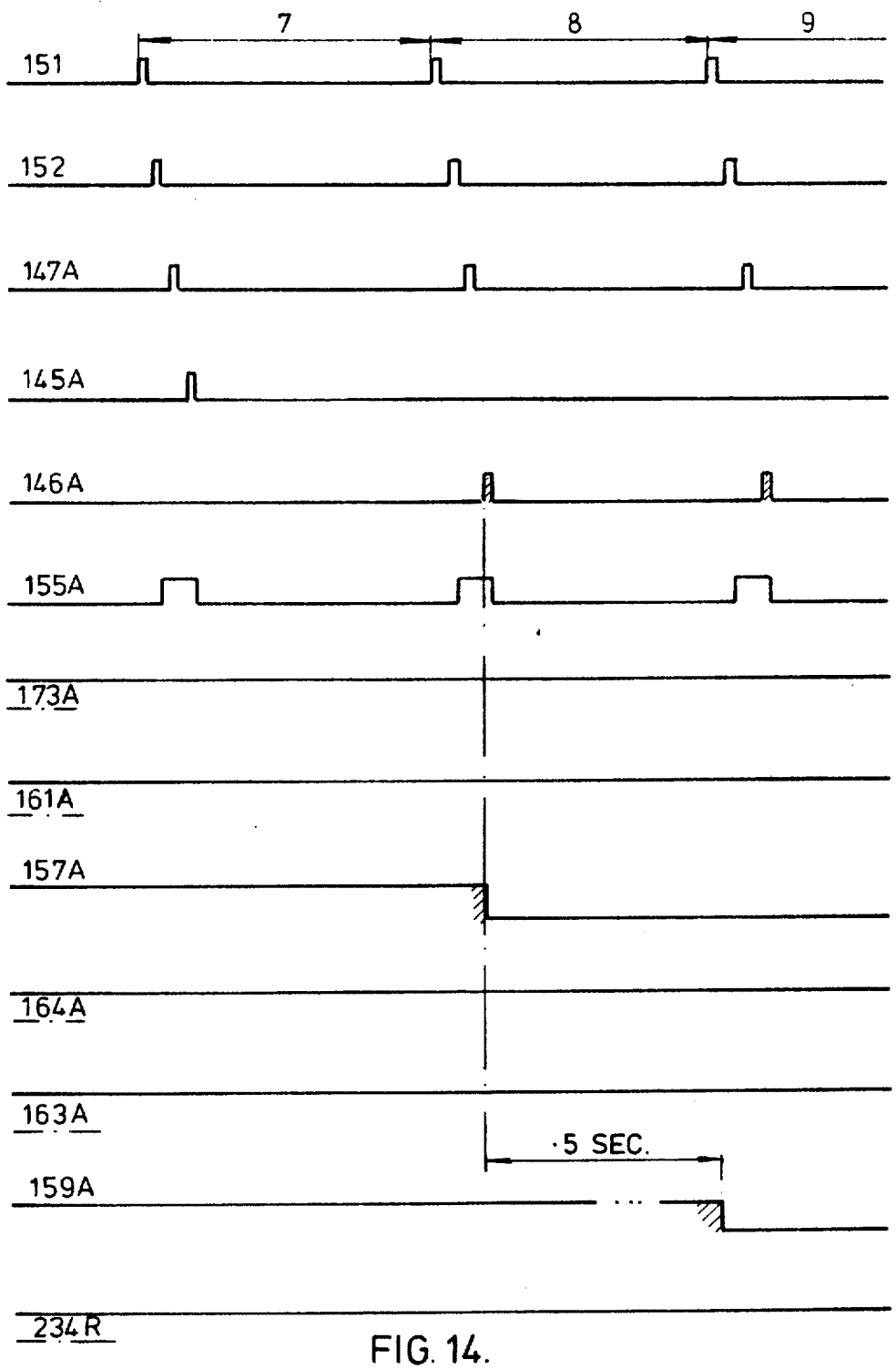
FIG. 14 is a continuation of FIG. 13 and shows the effect of a highway fault.
Figure 15:
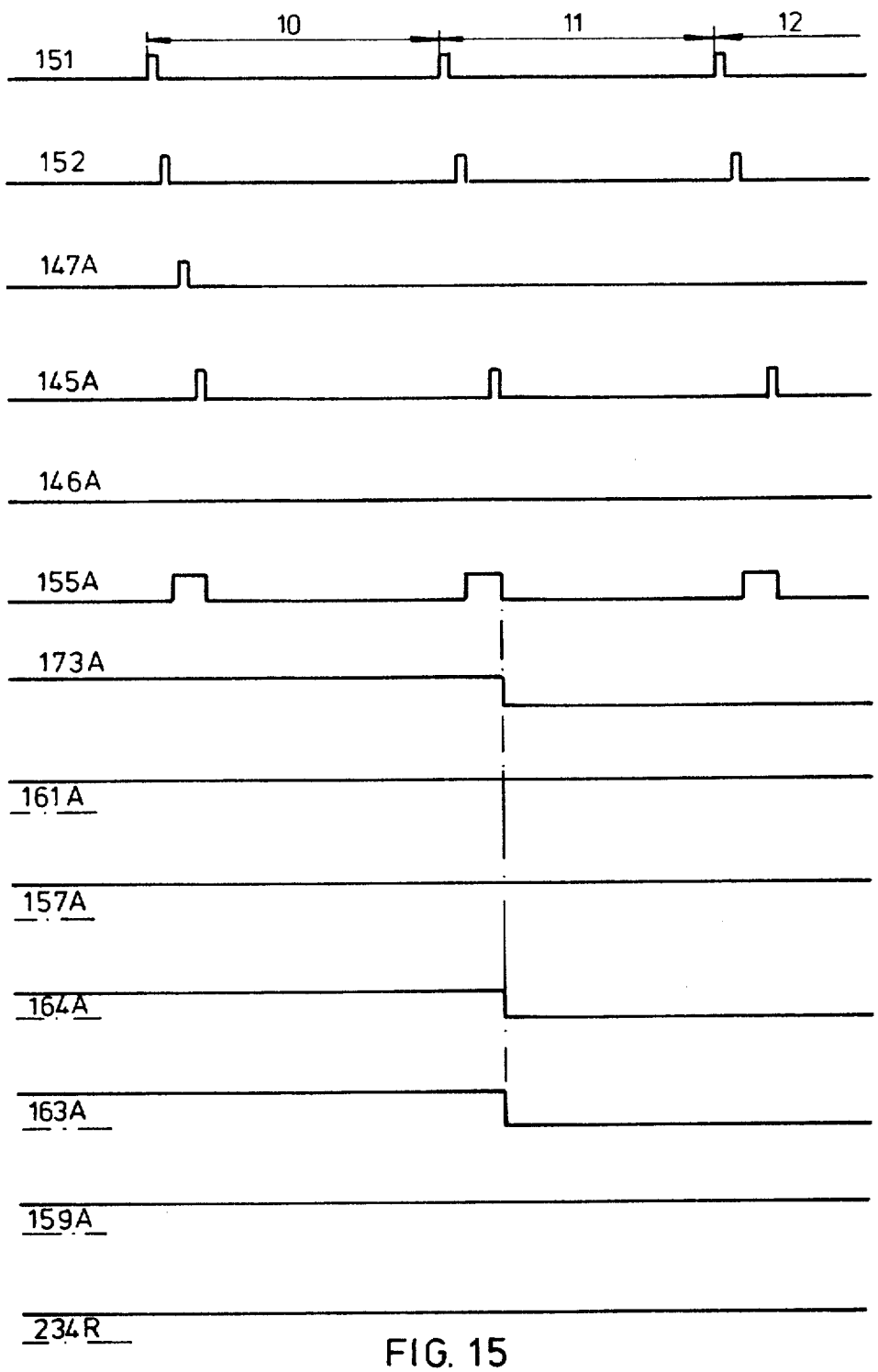
FIG. 15 is a continuation of FIG. 14 and shows the effect of a fault in the interconnection between the two computers.

In the case of a complete communication fault only the counter 158A is started; the highway connection is left undisturbed so that the computer can go on checking the highway during each of the sample periods remaining before the counter 158A depowers the computer. This arises essentially from the fact that whereas the signal 145A is connected to the counter 148A and to both the detectors 156A, 160A, the signal 146A is connected to the counter 148A and the detector 160A only. Therefore, in the case of a complete communication fault the detector 160A is addressed by the signals 146A, 155A and keeps the relay 128A on, but the detector 156A is addressed by the signal 155A only so that the output 157A is false and the delay counter 158A is started. The condition of a complete communication fault is shown in FIG. 14.

COINCIDENCE DETECTOR

Figure 8:
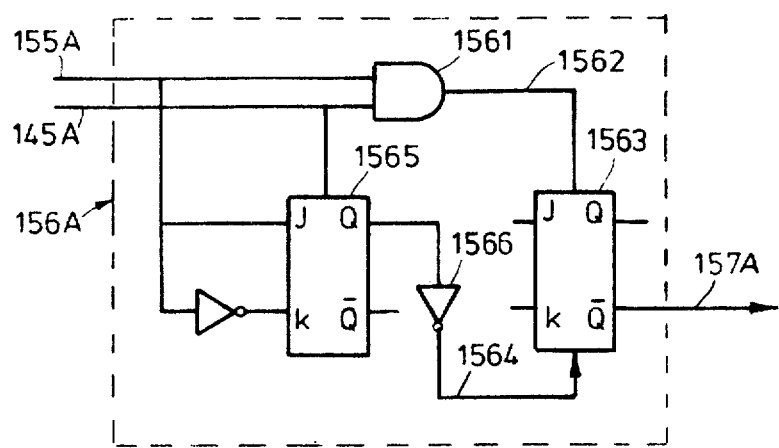
Figure 9:
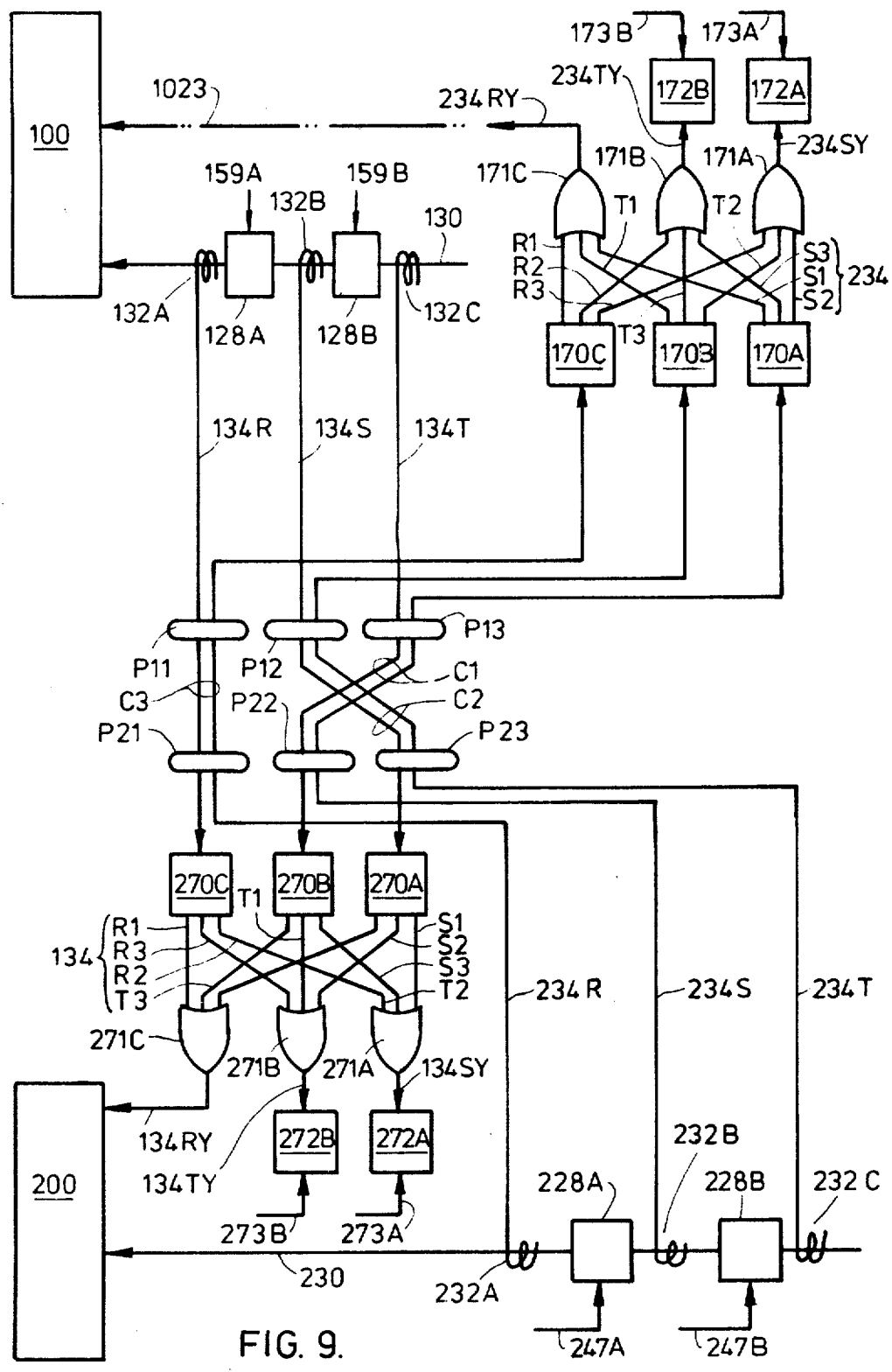

Details of the coincidence detectors e.g. the detectors 156A, 160A, 174A are given in FIG. 8 which shows the detector 156A. The other coincidence detectors are of identical construction but have their appropriate different inputs and outputs.

Referring to FIG. 8, the signals 145A, 155A are led to an AND gate 1561 whose output 1562 is true only if both the inputs are true. The output 1562 is led as a clock signal to a "JK" bistable 1563 having an output $\bar{Q}$ which defines said signal 157A (FIG. 6.1) and which is changed from false to true provided a reset signal 1564 is false which is normally the case. Thus as soon as the signal 145A goes true within the period of the signal 155A the signal 157A goes or stays true.

The signal 155A is also connected directly to an input J of a bistable 1565 and through an inverter to an input K of this bistable. The signal 145A is connected as a clock signal to the bistable 1565 with the effect that if the signal J is true and the signal K is false the clock signal causes an output Q to become or stay true. The output Q is connected through an inverter 1566 to define the signal 1564 and it will be clear that if the signal 145A goes true while the signal 155A is true the reset signal 1564 is false as is required to enable the signal 157A to go true.

If due to a fault the signal 145A goes true before the signal 155A goes true the signal 1562 remains false, the inputs J and K of bistable 1565 are false and true respectively with the consequence that the signal 145A into this bistable causes the output Q to become false. This changes the signal 1564 to "true" which in turn changes the signal 157A to "false" and thus indicates a fault.

If subsequently there is a correct coincidence of the signals 155A, 145A, the signal 1564 will be false, and the now true signal 1562 can take control of the bistable 1563 to change the signal 157A back to "true."

The signal 1562 can only be effective on its rising edge and since due to the delay through the inverter 1566 the signal 1564 does not become false until slightly after said rising edge, the signal 157A does not become true on the first but on the second coincidence of the signals 155A, 145A after a fault. This means that one whole sample period must elapse before the fault can be cleared. This is desirable because if the fault should occur very briefly before the end of a sample period it is possible that the relay 165 (FIG. 6.1) does not have time to respond before the fault is cleared at the beginning of the next sample period. A fault occurring repeatedly in this way could remain undetected if the delay through the inverter 1566 were not provided.

Other refinements (not shown) may be introduced in the detector 156A to ensure detection of other signal faults, for example the double occurrance of a signal 145A within the period of the signal 155A.

INTERLOCK SYSTEM AND INTERLOCK FAULTS

In the case of an interlock fault, both detection and response take place in the fault response system. The computer merely reads out the signal 147A for checking whether its reading of the signal 234RY was correct. This check is effected as follows.

Referring to FIGS. 1, 6.1, 6.2 and 9 the signal 234R from the computer 200 received at the plug P1:, is divided by a distributor or junction 170C into signals 234R1, 234R2 and 234R3 which are lead respectively to the computer 100, the response unit 126A and the response unit 126B. The check consists in comparing the signal as received by the computer with the signals as received by the respective response units.

As shown in the drawings, the signal 234R1 is led to the computer 100 through an OR gate 171C whose output 234RY is lead through an OR gate 175 (FIG. 6.1) giving access to the input highway 102. The signal 234R2 is lead to an OR gate 171A whose output 234SY is an input to an equivalence detector 172A, known per se, having a second input 173A from a coincidence detector 174A (FIG. 6.1) which in turn has inputs from the signals 155A, 147A. The signal 234R3 is lead to an OR gate 171B whose output 234TY is an input to an equivalence detector 172B (FIG. 6.1) having a second input from a coincidence detector 174B which in turn has inputs from the signals 155B, 147B.

The "no fault" condition is satisfied if the signals 234SY and 173A are both the same, and both the signals 234TY and 173B are the same. If the two inputs at each of the detectors 172A, 172B are both true, this means that the computer 100 has read the signal 234R1 to the effect that the computer 200 is on power and that this reading checks with the signals 234S and 234T. If the two inputs at each of the detectors 172A, 172B are both false, this means that the computer 200 has been read and checked to be off power.

If there is no equivalence between the two inputs to the unit 172A, then the reading of the condition of the computer 200 is said to be faulty; the output 164A of the equivalence detector becomes false; the signal 163A becomes false and the relay 165 removes the power from the couplers 167, 168 to disconnect the computer 100 from the highway 103 and switch 104. A similar situation arises if the two inputs to the unit 172B are not the same, but in this case the signal 163B is connected to the switches 104, 204 to break a connection there, as will be described later herein. Assuming the computer 100 itself to be in order (apart from any possible fault causing the misreading of the signal 234R1), the disconnection of the highways is then detected by the computer 100 as a complete communication fault with the consequence that the relays 128A, 128B are caused to de-power the computer 100 after the delay period of 0.5 sec. In other words, computer 100 is de-powered if the signals 234RY, 234SY and 234TY are not found to be the same. If computer 200 is de-powered and computer 100 does not read the state of computer 200 correctly then there is a condition in which both computers become de-powered. In this fault condition, which is statistically remote, the engines would normally remain at the last controlled setting but they can be frozen by removal from the input-output units of power supplies which rely for their maintenance on signals from the computers.

To ensure a high safety factor in the interlock system there are provided in addition to the sensor 232A two further sensors 232B and 232C led by different routes from the one channel to the other. The sensor 232B has an output 234S led through plugs P22, P13 into the unit 126A where a distributor 170A divides the signal 234S into a signal 234S3 connected to the equivalence detector 172B via the OR gate 171B, a signal 234S1 connected to the input highway 1023, via the OR gate 171C, and a signal 234S2 connected to the equivalence detector 172A via the OR gate 171A. The sensor 232C has an output 234T lead through the plugs P23, P12 into the unit 126B where a distributor 170B divides the signal 234T into a signal 234T1 connected to the input highway 1023 via the gate 171C, a signal 234T2 connected to the equivalence detector 172a via the gate 171A, and a signal 234T3 connected to the equivalence detector 172B via the gate 171B. In this way each sensor 232A, 232B, 232C is connected to the computer 100 and to each of the units 172A, 172B with a correspondingly high degree of safety in the interlock system.

It will be clear that the computer 200 is adapted to read whether the computer 100 is on power, in the same way as computer 100 reads the state of computer 200.

THE HIGHWAY SWITCH

As shown in FIG. 10.1 the address and output lines 1021, 1022 of the highway 102 are connected respectively through AND gates 1801X, 1802X and OR gates 1812, 1811 to the address and output lines 1062, 1061 of the highway 106, and the input line 1023 is connected as the output of an AND gate 1803X having an input from the highway line 1063.

Correspondingly, the highway 203 is connected to the highway 106 through AND gates 2801Y, 2802Y, 2803Y. The arrangement is drawn assuming the highways 102, 106 to be connected and all signals which have to be true under this condition are shown in thick lines while signals which are to be false are shown in thin broken lines. Further, there is provided an interlock arrangement such that while the highway 102 is connected to the highway 106, the highway 203 is excluded from such connection.

To connect line 1021 an address decoder 184X connected to line 1021 is adapted to make true an address signal 182X thereby to switch a bistable 185X such that its one output 185AX goes true while its other output 185BX goes false.

To disconnect highway 203 an address decoder 284Y connected to line 2031 is adapted to make true an address signal 283Y to switch a bistable 285Y such that its one output 285BY goes true while its other output 285AY goes false.

The interlock arrangement is such that to connect highway 102 the signals 185AX and 285BY must both be true. To this end these two signals are led into an AND gate 187X whose output is connected, when both inputs are true, to switch a bistable 188 to render true a signal 188A. The latter signal can be used directly to enable the gates 1801X, 1802X, 1803X. However to avoid the consequences of a possible fault condition arising in the bistable 188, the signal 185AX is led together with the signal 188A to an AND gate 186X whose output is connected to enable the AND gates 1801X, 1082X and 1083X.

To connect the highway 203 to the highway 106 requires the switching of the bistables 285Y and 185X such that the signals 285AX and 185BX respectively are true, thereby enabling an AND gate 287Y and switching the bistable 188 to make true a signal 188B to an AND gate 286Y having another input from the signal 285AY. If both signals 188B, 285AY are true the output of the AND gate 286Y goes true and enables the AND gates 2801Y, 2802Y, 2803Y.

Reverting to said interlock, this is constituted by the signals 185BX, 185BY. It will be clear that if the computer 200 should attempt to gain access through the highway 203 to the highway 106 while the highway 102 is so connected, the necessary switching of the bistable 285Y to make true signal 285AY is without effect because signal 185BX is false and the AND gate 287Y cannot be enabled.

AND gates 197X and 198X are provided for directly reading the output of the gates 286Y and 186X, respectively, into the input line 1023. The outputs of the gates 286Y and 186X are also readable directly into the input line 2033 by means of AND gates 298Y and 297Y, respectively.

As mentioned under FAULT RESPONSE SYSTEM and elsewhere, the signal 163B is connected to the switches 104, 204. As shown in FIG. 10.1 the signal 163B is connected to the bistable 185X to switch or lock this bistable into the condition in which the signal 185AX is false and the signal 185BX is true. This disconnects the highway 102 from the highway 106.

Referring to FIG. 10.2, the switch 204 is in all respects the same as switch 104 and corresponding reference numerals are employed for like parts, parts operated by address signals on the highway 103 having the prefix "1" and the suffix "Y," while parts operated by address signals on the highway 202 have the prefix "2" and the suffix "X." The signal 163B1 is connected to the bistable 185Y to disconnect the highway 103. There are of course signals 263B, 263B1 from the fault response unit 226B connected to the bistables 285X (FIG. 10.2) and 285Y (FIG. 10.1).

MULTIPLEXERS AND TRANSDUCERS

Figure 11:
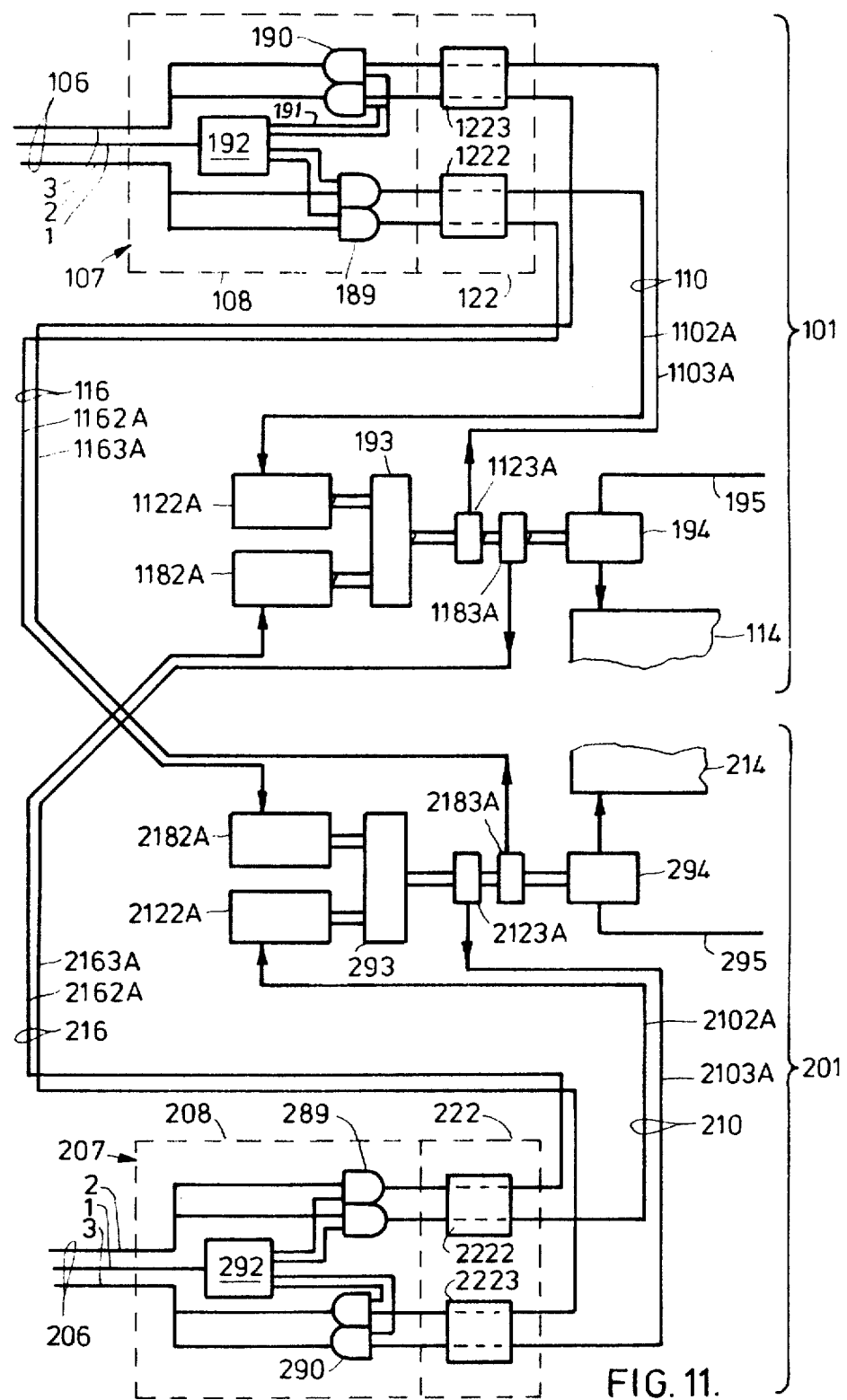
FIG. 11 is a representation of input-output connections to said engines.

Referring to FIG. 11, the multiplexer 108 of the input-output unit 107 comprises in respect of each transducer 112 AND gates 189, 190 for connecting the appropriate transducer line to the highway lines 1062, 1063 respectively. The connection is made by address signals 191 from a decoder 192 connected to the highway line 1061. The transducer lines 110 are shown as carrying signals 1102A, 1103A. These signals are connected through the converter 122 to two analogue transducers 1122A, 1123A, the connection being through converters 1222, 1223 which respectively convert the output signal from digital to analogue form and the input signal from analogue to digital form. The transducer 1122A is an electric motor connected to drive a valve 194 in the fuel supply 195 to the engine 114. The transducer 1123A is a sensor for the valve position. Multiplexers, converters and transducers of this kind are known per se and need not be further described.

The duplicate transducers are indicated 1182A and 1183A, the motor 1182A being connected to the motor 1122A through a differential gear 193 so that either motor can drive the valve 194

FIG. 11 also shows the input-output unit 207 and the transducers 212, 218 of the engine 214. Like parts are given like reference numerals in both channels except that, as elsewhere in this specification, the parts of channel 101 start with the figure "1" whereas the parts of the channel 201 start with the figure "2".

Also, it will be seen that the transducer lines 116 have a signal 1162A for operating a motor 2182A and a signal 1163A for reading a valve position sensor 2183A Similarly signals 2162A and 2163A are used for respectively operating and reading the actuator 1182A and sensor 1183A.

It will be understood that the suffix "A" is used to denote the first of a series A, B, C . . . N of transducers.

THE OVERALL SYSTEM PROGRAM

The following is a description of the program 138 of the computer 100. Computer 200 has an identical program which, solely to indicate its location, is denoted 238 (FIG. 1).

The program 138 makes use of fault markers which are signals contained in store locations and which are set or cleared by certain sections of the program 138 and which provide information for other sections of the program. If the marker is clear there is no fault. The markers:

M0= complete communication fault, i.e. computer cannot gain access to its associated engine.
M1= fault in the connection between computer 100 and the input-output unit 107.
M2= fault in the connection between computer 100 and the input-output unit 207.
M3= fault in motor 1122A.
M4= fault in motor 1182A.
M5= "other" computer, i.e. computer 200, not on power.
M6= fault in motor 2122A.
M7= fault in motor 2182A.

It is to be understood that in the present example there are markers for all actuating transducers but none for the sensing transducers.

The store includes locations for the signals 144A, 144B, for all the data read from the sensing transducers, and for the so-called "highway connect counter" explained later herein.

The seven sections (FIG. 5) of the program 138 will now be described with reference to the flow diagramms.

Figure 16:
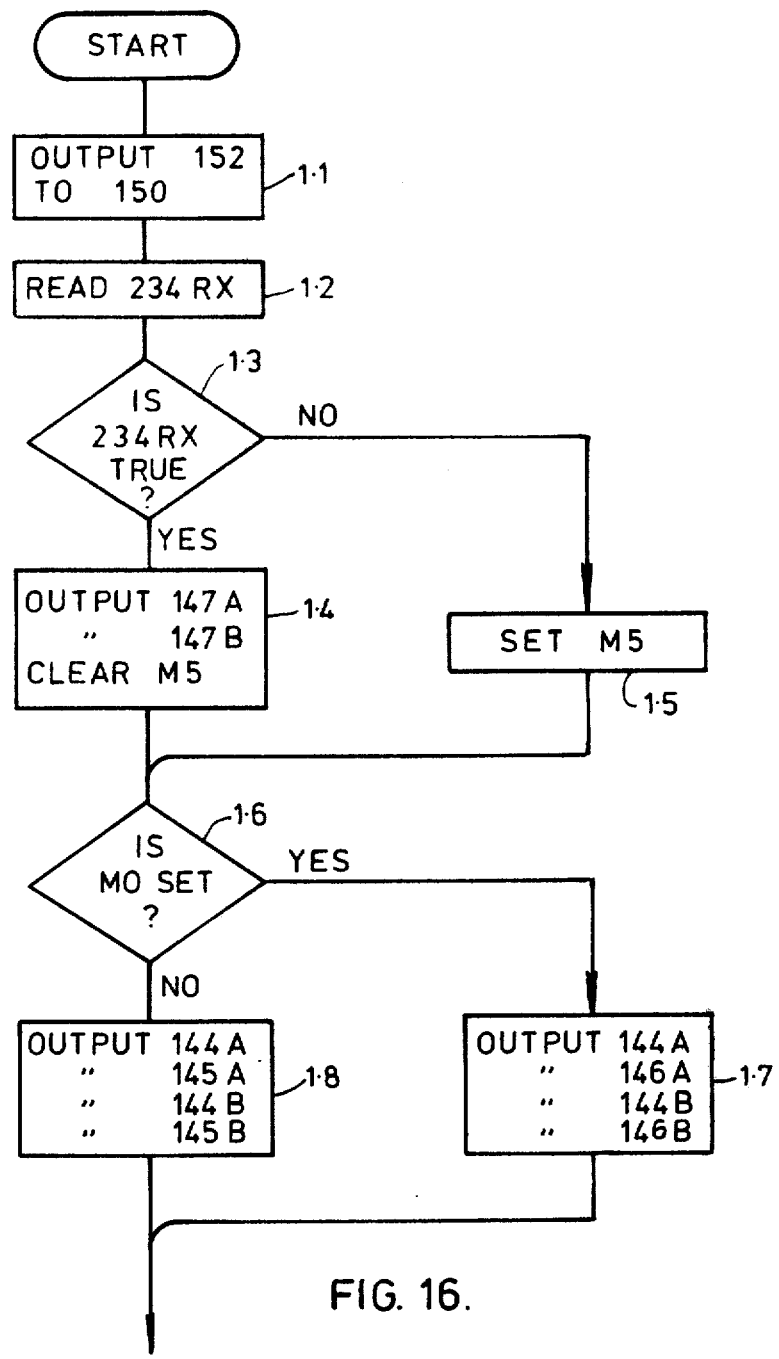
FIGS. 16 to 23 are sequential flow diagrams of the overall system program of the control system.

Section 1.0 (FIG. 16) of the program 138 is concerned with starting the sample rate clock and outputting the fault signals.

The generation of the signal 151 by the clock 150 interrupts the base level program 137 and starts the program 138. The first step of section 1.0 is to output the signal 152 (block 1.1) to reset the sample rate clock 150. Thereafter the section reads the signal 234RY at block 1.2 which, if true (decision 1.3), shows that computer 200 is on power.

If the computer 200 is on power, the section outputs the signals 147A, 147B and clears marker M5 at block 1.4. If the computer 200 is not on power these signals are omitted and the marker M5 is set at block 1.5.

If there was a communication fault in the previous sample period, marker M0 will have been set then. Accordingly, in section 1.0, if the marker M0 was set (decision 1.6) the section outputs signals 144A, 144B to the addresses 146A, 146B respectively (block 1.7). Otherwise the signals 144A, 144B are output to addresses 145A, 145B respectively (block 1.8).

Section 2.0 (FIG. 17) seeks to connect the computer 100 to the input-output unit 107, and as a safety measure checks that while the computer 100 is connected to the unit 107 it is not also connected to the input-output unit 207 or the computer 200 is not connected to unit 107. The section is not specifically timed relative to the corresponding section of the computer 200 so that both programs could seek access to the unit 107 simultaneously. In this context there is provided said highway connect counter which is used to maintain the attempt of the program to connect the computer 100 for a period of time longer than the period over which the computer 200 is, in the course of carrying out its program, connected to the unit 107. As soon as the computer 200 has finished, the computer 100 can make good its access attempt. Then, assuming there has not been any fault, the program provides the computer with access to the transducers 112 for normal use and provides access to the transducers 218 in case computer 200 is depowered.

Figure 17:
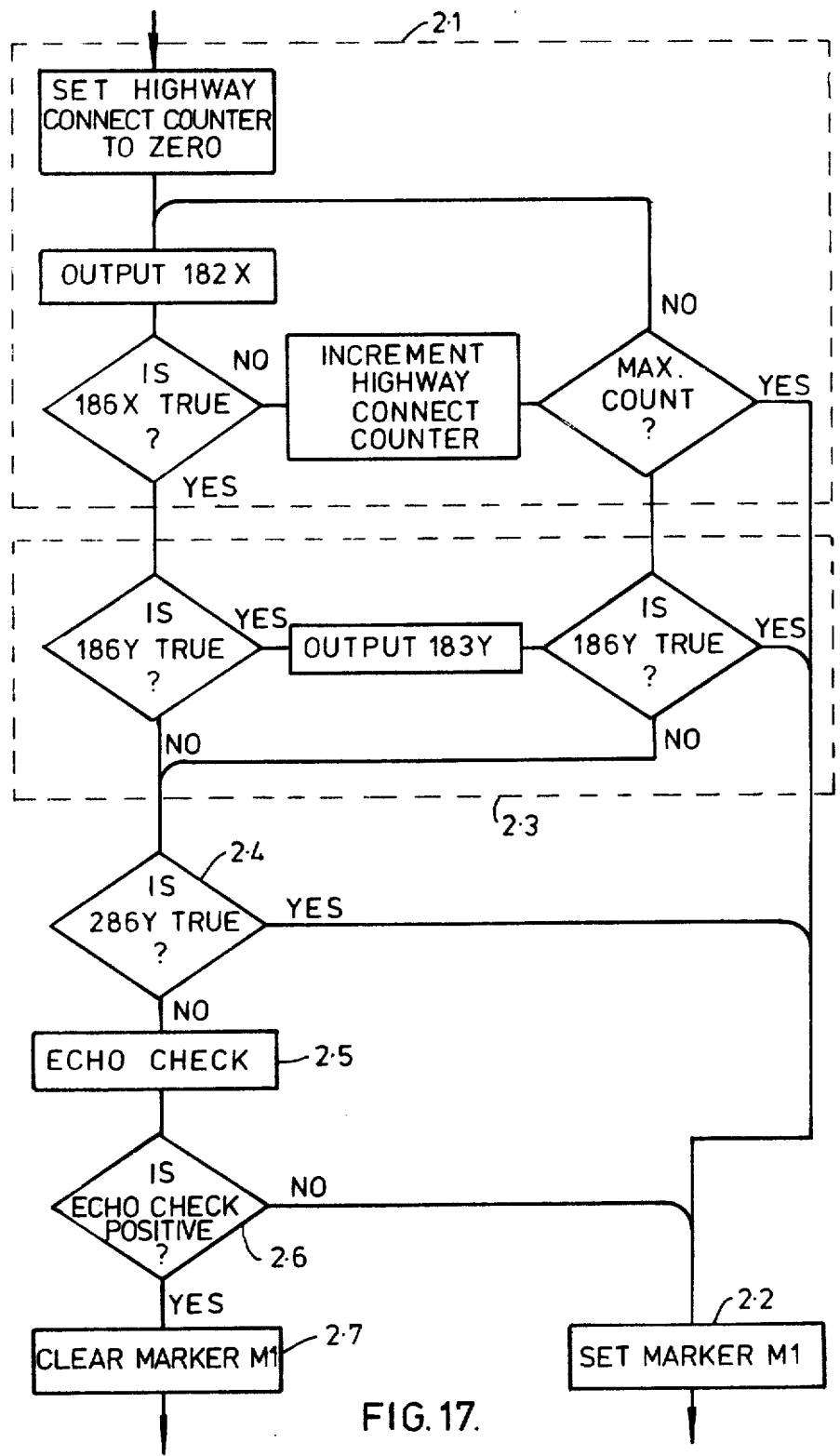

As shown in FIG. 17, the attempt to connect to input-output unit 107 is made in sub-section 2.1 by addressing the highway switch 104 through signal 182X and checking whether the connection has actually been achieved by checking whether signal 186X is true. If the connection is not achieved the attempt is repeated under the control of the highway connect counter. If connection is not achieved by the time the counter has reached a predetermined maximum count, marker M1 is set at block 2.2.

If the connection to the input-output unit 107 is achieved, sub-section 2.3 checks whether there exists a simultaneous connection to the input-output unit 207 by checking whether signal 186Y is true. If such connection exists signal 183Y is output to attempt to disestablish the connection and the signal 186Y is checked again. If the connection to the unit 207 persists the marker M1 is set at block 2.2.

If connection to unit 107 is established and there is no connection to unit 207, a check is made whether signal 286Y is true (decision 2.4), i.e. whether computer 200 is connected to unit 107 due to a fault in highway switch 104. If signal 286Y is true, marker M1 is set. Otherwise the section goes on to carry out a so-called "echo" check 2.5 which is a type of continuity check, known per se, on the connection between the computer 100 and the unit 107. If the echo check result is positive (decision 2.6) the marker M1 is cleared at block 2.7. Otherwise the marker M1 is set at block 2.2.

Figure 18:
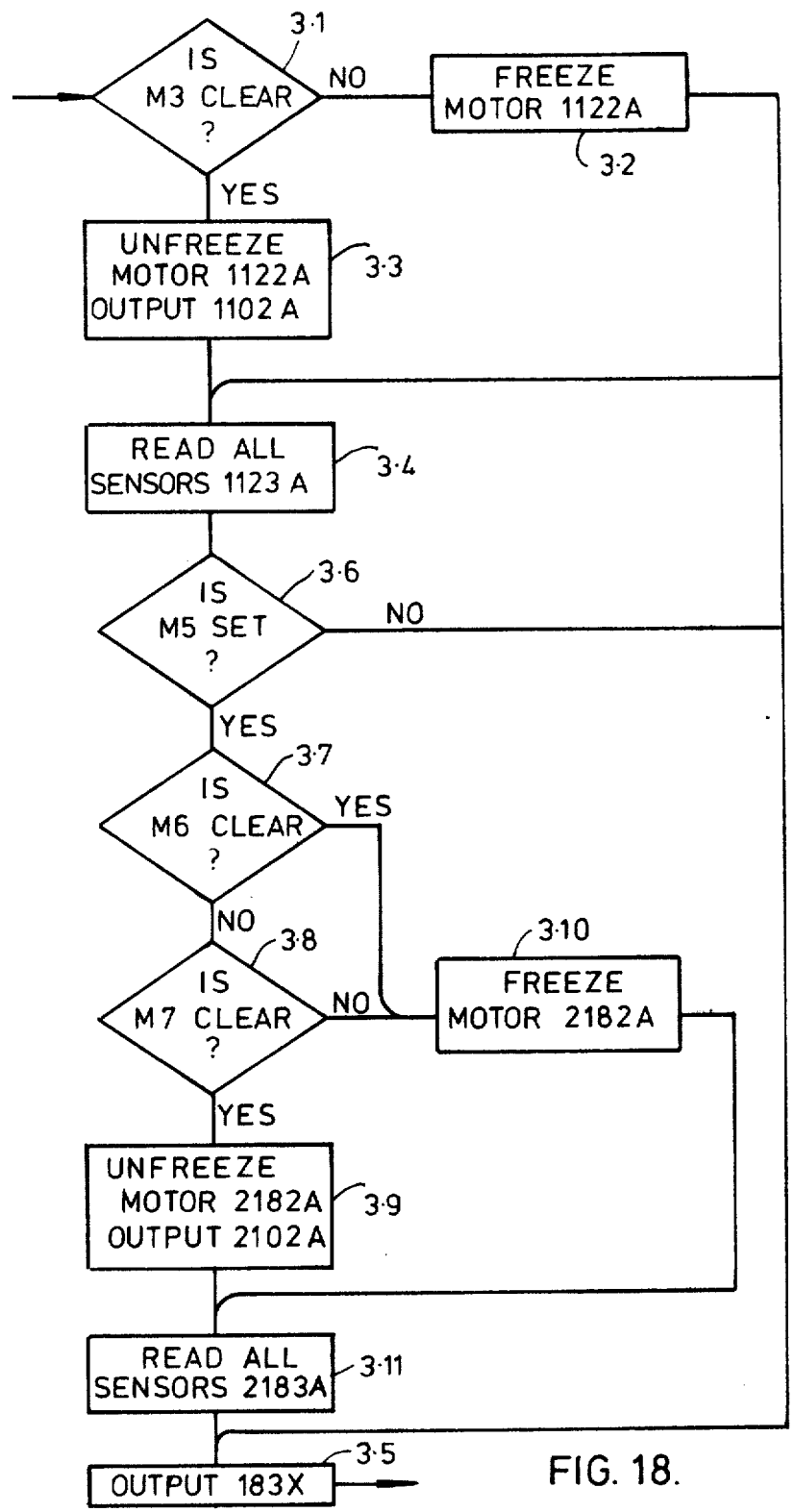

Setting of the marker M1 for whatever reason is followed by disconnection of the unit 107 at 3.5 (FIG. 18).

In Section 3.0 (FIG. 18) the computer 100 addresses itself to the actuating transducers 1122A to carry out the requirement made by the engine control program for engine 114 during the previous sample period and to read the sensing transducers 1123A for data required by the engine control program in the current sample period. The computer 100 has similar access to the transducers 218 if the reading of a marker set by program 1.0 shows that computer 200 was depowered. Initially the program reads markers, set in the previous sample period, indicating the usability of certain actuating transducers and proceeds on the basis of such readings.

As shown in FIG. 18 signal 1102A is output for driving the motor 1122A (block 3.3), the sensors 1123A are read (block 3.4) and finally the computer is disconnected from the unit 107 (block 3.5). If the motor 1122A is not o.k. (decision 3.1), the program freezes this motor (block 3.2), i.e. disconnects this motor from its power supply and applies a break to the motor shaft. At this stage no attempt is made to work motor 1182A (this is done in section 5.0). As far as control of engine 214 is concerned, the program investigates whether computer 200 is on power (decision 3.6) and, if not, whether motor 2182A is to be used because this is the motor to which the computer 100 has, at this stgae, direct access. If motor 2122A is not o.k. (decision 3.7) and motor 2182A is o.k. (decision 3.8), then the latter is used for control and is driven (block 3.9). Otherwise the motor 2182A is frozen (block 3.10). The sensors 2183 are read at 3.11 before the computer 100 is disconnected from the unit 107 at block 3.5.

Figure 19:
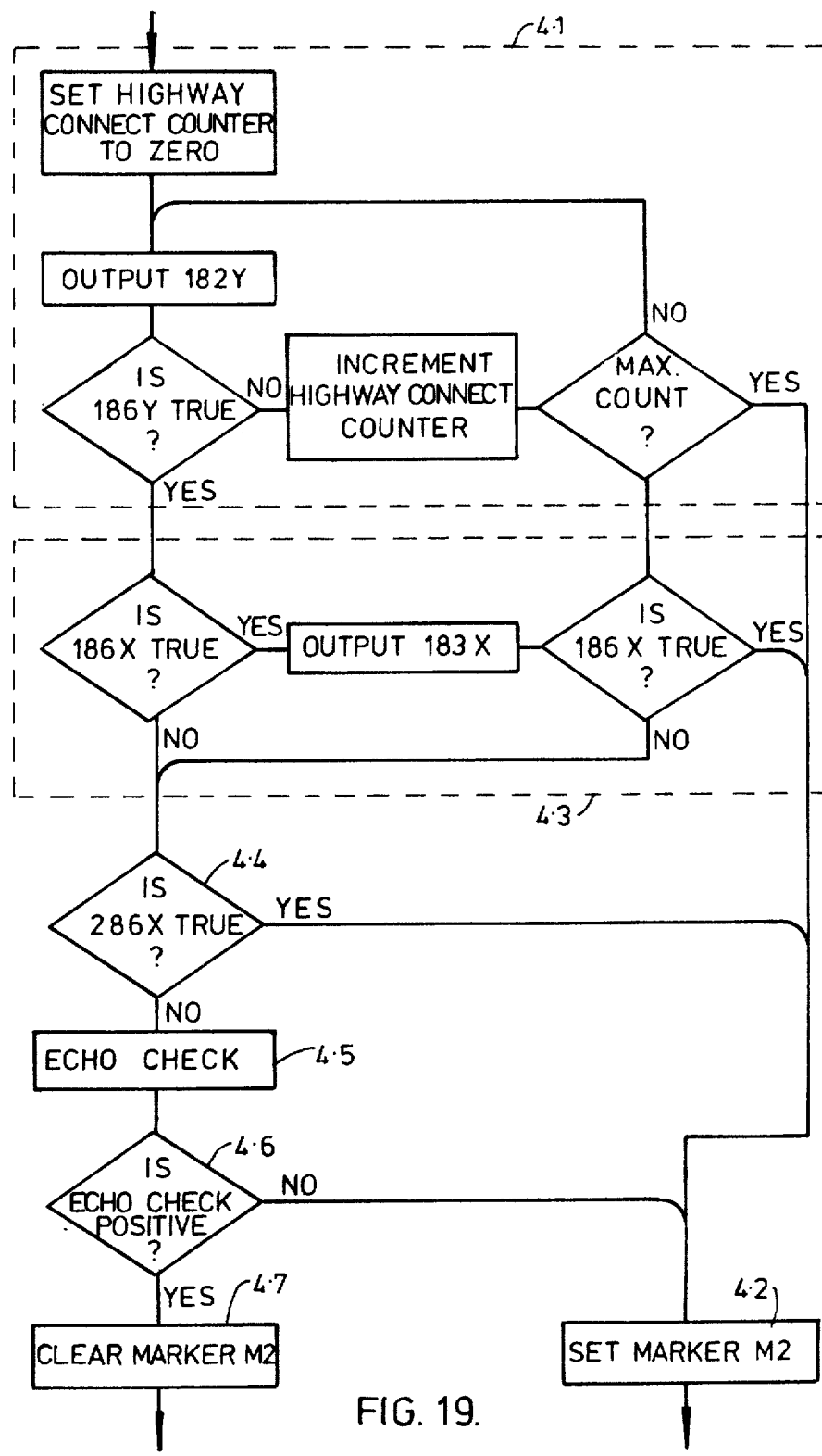

Section 4.0 (FIG. 19) seeks to connect the computer 100 to the input-output unit 207, and as safety measure checks that while the computer is so connected it is not also connected to the unit 107 or the computer 200 is not connected to the unit 207. This section is the same as section 2.0 except for the destination of the signals. Section 4.0 is therefore not specifically described but it may be emphasised that this section provides the computer 100 with access to the transducers 118 for use in case of a highway or transducer fault affecting the transducers 112. Further section 4.0 provides the computer 100 with access to the transducers 212 for use if computer 200 is depowered.

Figure 20:
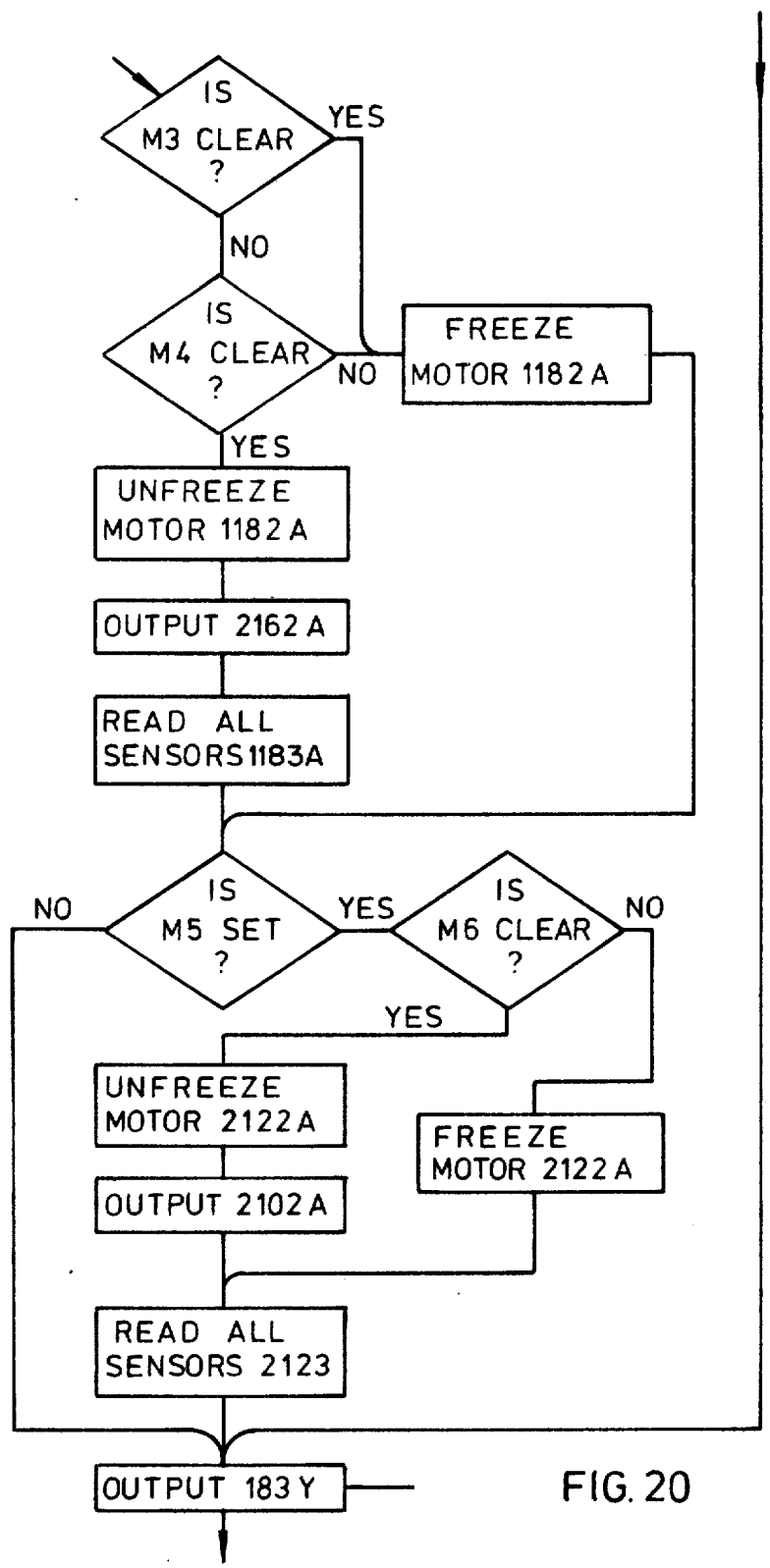

Section 5.0 (FIG. 20) is similar to section 3.0 but addresses itself to the transducers 118 in the case when there is a fault in any transducer 112, although as a matter of convenience the section reads sensing transducers 1183A irrespective of whether there was a fault in a sensing transducer 1123A or not. Also, section 5.0 addresses itself to the transducers 212 if computer 200 was depowered except that, as far as actuating transducers 2122A are concerned, the section will not address them if they have been found to be not o.k. in section 3.0 and the actuators 2182A have in consequence been used by the latter section.

Figure 21:
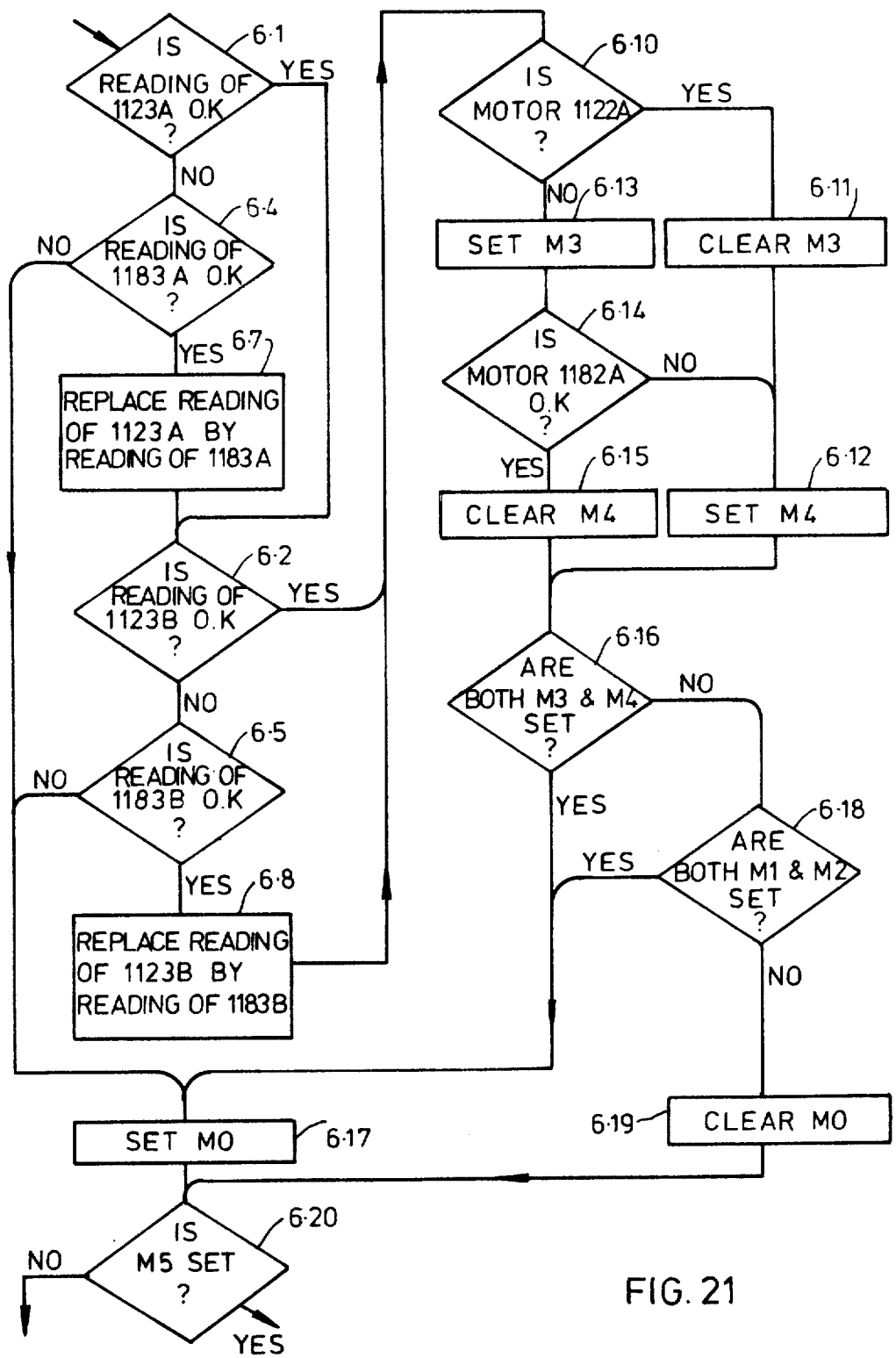
Figure 22:
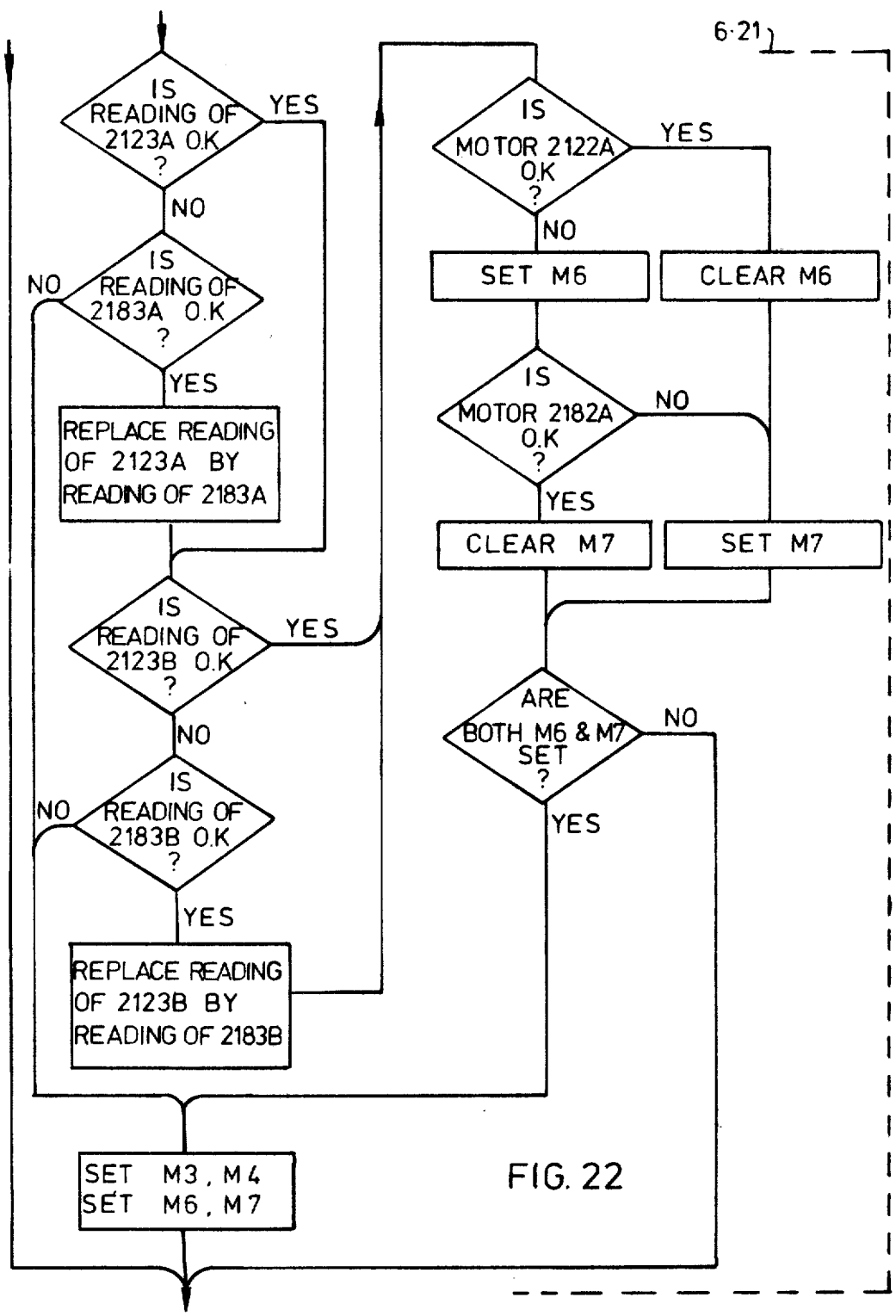

Section 6.0 (FIGS. 21, 22) checks all transducers 112, and if any one of them is faulty the section checks the corresponding transducer 118. If the latter transducer is o.k. it will be used. If it is not o.k. then a communication fault exists and the marker MO is set with appropriate consequences in section 1.0 during the next sample period.

As regards sensors 1123A, section 7.0 (to be described) takes account only of sensors 1123A and ignores sensors 1183A. Therefore, in section 6.0, if any sensor 1123A is found to be faulty (decisions 6.1, 6.2), and the corresponding sensor 1183A is o.k. (decisions 6.4, 6.5), the reading of the sensor 1123A is replaced in the computer store by the reading of the corresponding sensor 1183A (blocks 6.7, 6.8). If any sensor 1183A is not o.k., then the marker MO is set at block 6.17).

As regards actuators 1122A, 1183A, sections 3.0 and 5.0 are programmed to address only actuators whose markers are clear. Therefore, in section 6.0, if an actuator 1122A is o.k. (decision 6.10), its marker is cleared (block 6.11) and the marker of the corresponding actuator 1182A is set (block 6.12) so that in sections 3.0 or 5.0 there can be no doubt as to which actuator, 1122A or 1182A, is to be addressed. If any actuator 112 is not o.k., then its marker is set (block 6.13), and the corresponding actuator 1182A is checked (decision 6.14). If the latter is o.k. its marker is cleared (block 6.15); if it is not o.k. its marker is set (block 6.12). A check for communication faults is made by checking whether the markers of two corresponding actuators 1122A, 1182A are both set (decision 6.16). If so, the marker MO is set at block 6.17.

The section also sets marker MO if markers M1, M2 (decision 6.18) are set (see sections 2.0, 4.0). Otherwise marker MO is cleared at block 6.19.

If computer 200 is not on power, computer 100 will control engine 214 provided there is no complete communication fault between the latter computer and engine. Therefore, the section checks whether computer 200 is on power (decision 6.20), and if so, the section carries out a check on transducers 212, 218 in the same way as the checks on transducers 112, 118 (sub-section 6.21, FIG. 22). If a complete communication fault is discovered in respect of transducers 212, 218 then the markers of all the actuators 2122, 2182 are set with the consequence that engine 214 is effectively frozen. Note that a complete communication fault between computer 100 and engine 214 does not result in the marker MO being set because computer 100 can of course still control engine 114.

The actual checking of the transducers is essentially by comparison either with a model or with a reading taken from a duplicate sensor. For example, the checking of the position which the motor 1122A has attained in response to a drive signal demanding a given position is done by comparing a reading of the sensor 1123A with the output of a model of the known dynamic characteristics of the motor. The model is a program which modifies the demand signal in accordance with said characteristics to simulate the position which the motor is expected to attain. The output of the model is then compared with the reading of the sensor 1123A of actual motor position.

Figure 23:
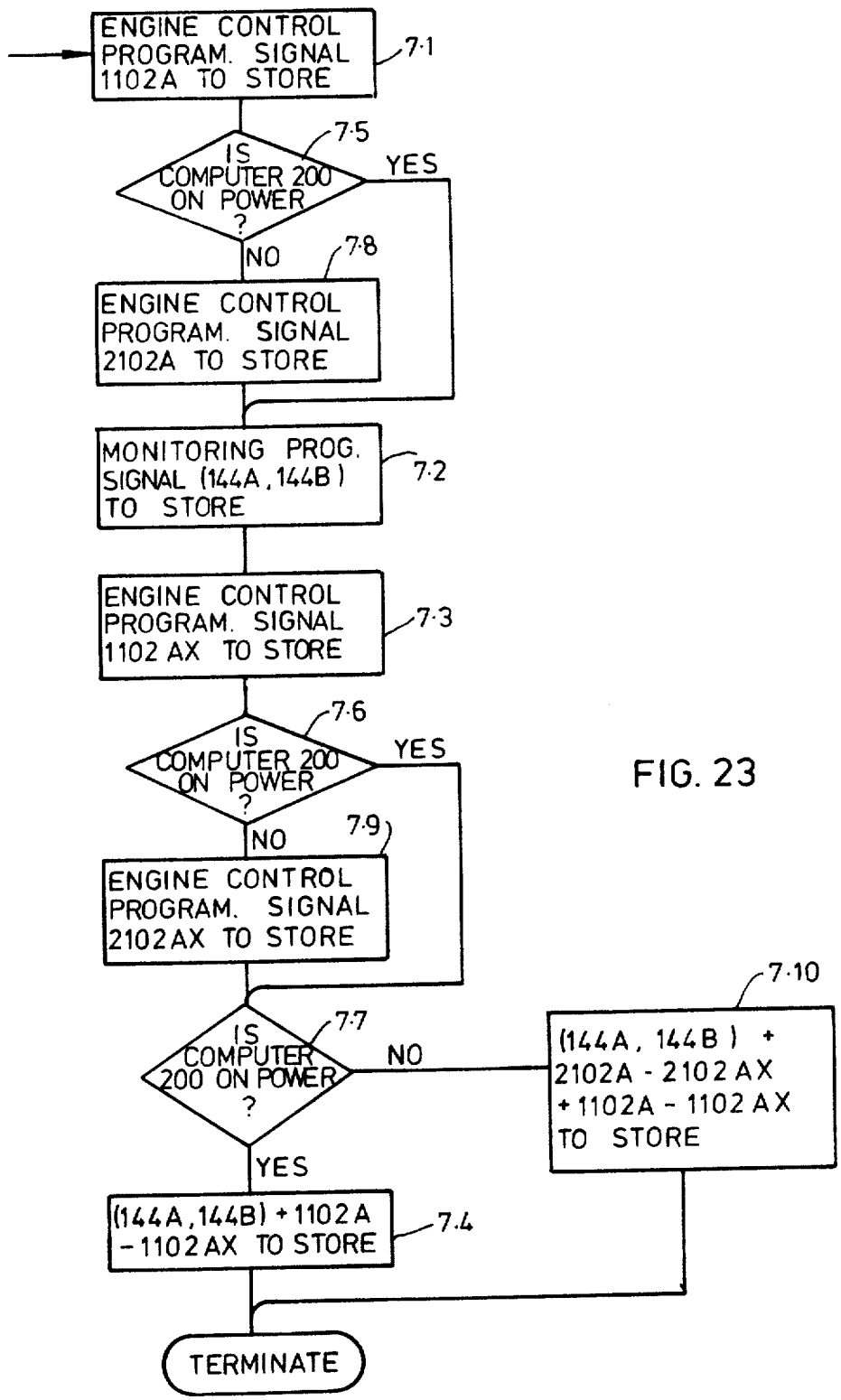

Section 7.0 (FIG. 23) carries out the engine control program, i.e. it determines from the sensor readings what actuator signals are necessary to operate the engines. In this example, the section determines in block 7.1 the fuel flow signal 1102A necessary in engine 114 to satisfy a speed demand signal from the pilot or determines a restriction of fuel flow in consequence of a change in altitude. These processes are well understood and need not be described in detail.

Further the section includes a monitoring program 7.2 in which the control processor unit of the computer is operated with given numerical data so that if the unit is in order there is produced a known double length number (144A, 144B) being the data defining the signals 144A, 144B. This monitoring program will of course only detect permanent faults and transient faults present while the monitoring program itself is run.

To detect transient faults occurring outside the period of the monitoring program, the engine control program is run twice, once (block 7.1) before and once again (block 7.3) after the monitoring program 7.2. The run 7.2 produces a signal 1102Ax which is subtracted from the signal 1102A and the difference is added to the signal (144A, 144B) at block 7.4. If there was a transient fault during either engine control program 7.1, 7.3, there is a very high probability that the signals 1102A and 1102Ax are not identical. In consequence their difference will have a significant value and will affect the data (144A, 144B).

If the computer 200 is not on power, (decisions 7.5, 7.6, 7.7) the section performs the engine control programs (blocks 7.8, 7.9) and computer checking operations (block 7.10) (other than the monitoring program) also for engine 214 on the basis of readings from the sensors of that engine.

The end of section 7.0 terminates the interrupt of the base level program 137.

As mentioned, the programs 138, 238 are identical. This means that for the purposes of these programs the first figure "1" in the reference numeral of the signals, e.g. the "1" in 183X, means "pertaining to the associated channel" whereas the first figure "2," e.g. the "2" in 283X, means "pertaining to the other channel."

MODIFICATIONS

In a modification the program is organized so that computer 100 normally controls both engines while computer 200 only operates section 1.0 (FIG. 16) of its program 238. If computer 100 is on power the program 238 terminates with section 1.0; otherwise it goes on with the remainder of the program to control both engines. Under these circumstances a number of simplifications can be made in the programs 138, 238. The disadvantage of this modification is that system safety is less to the extent that any undetected fault in the computer 100 will affect both engines.

In a further modification the two computers are used to control one engine, e.g. engine 114. In this case the input-output unit 107 addresses only transducers 112 and the input-output unit 207 addresses only tranducers 118.

We claim:

1. An on-line computer control system for a technical plant comprising a first digital computer (100) for controlling the plant (114), a second digital computer (200) for controlling the plant, means (139, 138:1,1,150) provided in respect of the first computer for generating a timing signal (151) at regular intervals of time, means (239, 238:1.1, 150) provided in respect of the second computer for generating a timing signal (251) at regular intervals of time, means (138,238) provided in each computer for controlling the plant when connected thereto, first switch means (104) arranged between the two computers and the plant and switchable between conditions in which the plant is connected respectively to the first and to the second computer, first switch operating means (138-2.0) provided in the first computer and responsive to the timing signal thereof for operating the switching means to connect the first computer to the plant for the control thereof, fault recognition means (138,126) for recognizing the occurrence of a fault in the first computer and outputting a fault signal (144,145,157) in response to the occurrence of a fault, means (128) responsive to a fault signal for disabling the first computer, means (132) responsive to disablement of the first computer for producing a disablement signal (134RY), means (C3) for communicating the disablement signal to the second computer, means (238-1.2) provided in the second computer and responsive to said timing signals thereof for checking for the presence of a said disablement signal, means (238-1.3,4.1) provided in the second computer responsive to the presence of a said disablement signal and responsive to the timing signal of the second computer for operating the switching means to connect the second computer to the plant for the control thereof.

2. System according to claim 1 wherein the fault-recognition means comprises means (132:2.2) responsive to a first said timing signal for causing the first computer (100) to make a check computation and produce a check number (144) being the result of such computation, a counter (148), means (138:1.8,145) responsive to a second said timing signal for starting the counter, means (1482) for limiting the count to the value of the check number, means (1484) for producing an end of count signal (153) consequent upon completion of the count, means (156) responsive to the time relationship between a third said timing signal and the end of count signal for generating a computer fault signal (157) if said time relationship fails to have a predetermined value.

3. System according to claim 2 comprising means (104) settable to (138:6.18,6.17,1.6,1.7) the first computer to the plant, means (138:2.0) for generating a signal (182X) for effecting said connection, means (186X) responsive to the settable means and indicative of a connection having been effected, means (138:2.0) responsive to the effecting signal and the indicative means for producing a communication fault signal (M1) in the event of the indicative means failing to respond to the effecting signal and the settable means, a time delay means (158) connected between said time relationship responsive means and said computer disabling means and initiatable to disable the computer after a predetermined lapse of time, and means (138:6.18,61.7,1.6,1.7) responsive to a said communication fault signal for intiating the delay means.

4. System according to claim 2 comprising a time delay means (158) connected between said time relationship responsive means and said computer disabling means and initiatable to disable the computer after a predetermined lapse of time, means (165,168) for breaking the connection between the first computer and the plant, and means (160) responsive to the end of count signal for acting on the connection breaking means to break said connection.

5. System according to claim 5 wherein the fault-recognition means comprise means (138:2.1,6.18) responsive to said timing signal of the first computer and arranged to operate consequent upon operation of the switch operating means for checking whether connection has been established between the first computer and the plant and producing a communication fault signal (MO) if the check result is negative, means (138:1.6) settable between first and second modes indicative respectively of the absence and presence of the communication fault signal, means (138:1.8) responsive to the first mode for outputting a check number (144) and a first operating signal (145), means (138:1.7) responsive to the second mode for outputting saiad check number and a second operating signal (146), a counter (148), means (1482) responsive to any one of the operating signals (145,146) for starting the counter, means (1482) for limiting the count to the value of the check number, means (1484) responsive to completion of the count for outputting an end of count signal (153), a signal delay means (158) of predetermined delay time, first coincidence detection means (154,156) for initiating the delay means responsive to failure of the end of count signal generated by any one said timing signal to occur in a predetermined time relationship to a said first operating signal (145) output in consequence of a following timing signal, means (128) responsive to the end of the delay time for disabling the first computer, second coincidence detection means (154,160) responsive to failure of the end of count signal generated by any one said timing signal to occur in a predetermined time relationship to a second operating signal (146), output in consequence of a following timing signal, for disconnecting the first computer from the plant.

6. System according to claim 1 comprising a second plant (214), second switch means (204) arranged between the two computers and the second plant and switchable between conditions in which the second plant is connected respectively to the second and to the first computer, second switch operating means (238:2.0) provided in the second computer for operating the second switch means to connect the second computer to the second plant for control thereof, an input-output unit (207) connected between the second switch means and the two plants and operable to connect the second switch means respectively to the first and second plant, a first set of control transducers (112) connected to the first plant for control thereof, means (106,107) for carrying communication between the first switch means and the first set of transducers for said control of the first plant by the first computer, a second set of control transducers (118) connected to the first plant for control thereof, means (216) for carrying communication between the second set of transducers and the input-output unit, means (138) provided in the first computer for operating the second switch means and the input-output unit to the second set of transducers.

7. An on-line computer control system for a technical plant comprising a first digital computer (100) for controlling the plant (114), a second digital computer (200) for controlling the plant, means (139,138:1.1,150) provided in respect of the first computer for generating a timing signal (15) at regular intervals of time, means (239, 238:1.1,150) provided in respect of the second computer for generating a timing signal (251) at regular intervals of time, means (138,238) provided in each computer for controlling the plant when connected thereto, first switch means (104) arranged between the two computers and the plant and switchable between conditions in which the plant is connected respectively to the first and to the second computer, first switch operating means (138-2.0) provided in the first computer and responsive to the timing signal thereof for operating the switching means to connect the first computer to the plant for the control thereof, said first computer, first switch means and plant comprising a channel (101), faut recognition means (138,126) for recognizing the occurrence of a fault in said channel and outputting a fault signal (144,145,157) in response to the occurrence of a fault, means (128) responsive to a fault signal for disabling the first computer, means (132) responsive to disablement of the first computer for producing a disablement signal (134RY), means (C3) for communicating the disablement signal to the second computer, means (238-1.2) provided in the second computer and responsive to said timing signals thereof for checking for the presence of a said disablement signal, means (238-1.3,4.1) provided in the second computer responsive to the presence of a said disablement signal and responsive to the timing signal of the second computer for operating the switching means to connect the second computer to the plant for the control thereof.

* * * * *